(12) United States Patent
Wakutsu et al.

(10) Patent No.: US 12,271,601 B2
(45) Date of Patent: Apr. 8, 2025

(54) MEMORY SYSTEM HAVING TWO OR MORE WRITE MODES

(71) Applicant: Kioxia Corporation, Tokyo (JP)

(72) Inventors: Takashi Wakutsu, Kamakura Kanagawa (JP); Yasuaki Nakazato, Kamakura Kanagawa (JP); Takeshi Nakano, Kawasaki Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/162,275

(22) Filed: Jan. 31, 2023

(65) Prior Publication Data

US 2024/0094923 A1  Mar. 21, 2024

(30) Foreign Application Priority Data

Sep. 20, 2022 (JP) .................. 2022-149190

(51) Int. Cl.
  *G06F 3/06* (2006.01)
(52) U.S. Cl.
  CPC ............ *G06F 3/0619* (2013.01); *G06F 3/064* (2013.01); *G06F 3/0679* (2013.01)
(58) Field of Classification Search
  CPC ....... G06F 3/0619; G06F 3/064; G06F 3/0679
  See application file for complete search history.

(56) References Cited

U.S. PATENT DOCUMENTS

| | | | |
|---|---|---|---|
| 2019/0065366 A1* | 2/2019 | Muchherla | G06F 3/0689 |
| 2019/0095116 A1* | 3/2019 | Igahara | G06F 3/0604 |
| 2019/0332298 A1* | 10/2019 | Madabhushi | G06F 3/0679 |
| 2019/0377681 A1* | 12/2019 | Hodes | G06F 12/0848 |
| 2021/0232313 A1 | 7/2021 | Clark et al. | |
| 2021/0311660 A1* | 10/2021 | Saxena | G06F 3/0659 |
| 2021/0349662 A1* | 11/2021 | Helm | G06F 3/0659 |
| 2022/0075722 A1 | 3/2022 | Liang et al. | |
| 2022/0100377 A1 | 3/2022 | Yao et al. | |

* cited by examiner

*Primary Examiner* — Edward J Dudek, Jr.
(74) *Attorney, Agent, or Firm* — FOLEY & LARDNER LLP

(57) ABSTRACT

A controller assigns a first plurality of blocks among a plurality of blocks provided in a non-volatile memory to a first area, assigns a second plurality of blocks to a second area, and assigns a third plurality of blocks to a third area. The controller uses each block assigned to the first area in a first mode, uses each block assigned to the second area in a second mode in which the number of bits of data written in each memory cell is larger than that in the first mode, and uses each block assigned to the third area in the first mode or the second mode. The controller writes data received from a host device to an area that corresponds to a designation from the host device out of the first area and the third area. The controller transcribes valid data written to the first area and the third area to the second area.

12 Claims, 21 Drawing Sheets

MEMORY SYSTEM HAVING TWO OR MORE WRITE MODES

CROSS-REFERENCE TO RELATED APPLICATION(S)

This application is based upon and claims the benefit of priority from Japanese Patent Application No. 2022-149190, filed Sep. 20, 2022, the entire contents of which are incorporated herein by reference.

FIELD

Embodiments described herein relate generally to a memory system.

BACKGROUND

Memory devices including a non-volatile memory such as a NAND flash memory are widely used. In order to increase the capacity of a NAND flash memory, processes became finer and memory cells were located three-dimensionally. In addition to these, multi-levelled recording method is adopted in which data stored in one memory cell is 2 bits or more. The multi-levelled recording method greatly contributes to the cost reduction of memory systems equipped with NAND flash memories. However, deterioration in the maximum number of program/erase (P/E) cycles and write performance of a NAND flash memory is unavoidable. It is required to design the memory system such that the convenience is as high as possible while considering the advantages and disadvantages obtained from the multi-levelled recording method.

DETAILED DESCRIPTION

At least one embodiment provides a highly convenient memory system.

In general, according to at least one embodiment, a memory system is connectable to a host device. The memory system includes a non-volatile memory including a plurality of blocks and a controller electrically connected to the non-volatile memory. Each of the plurality of blocks includes a plurality of memory cells, and data can be written in a first mode and a second mode. The first mode is a mode in which data of a first number of bits is written in each memory cell. The second mode is a mode in which data of a second number of bits larger than the first number is written in each memory cell. The controller assigns a first plurality of blocks among the plurality of blocks to a first area. The controller assigns a second plurality of blocks different from the first plurality of blocks among the plurality of blocks to a second area. The controller assigns a third plurality of blocks different from any of the first plurality of blocks and the second plurality of blocks among the plurality of blocks to a third area. The controller uses each block assigned to the first area in the first mode, uses each block assigned to the second area in the second mode, and uses each block assigned to the third area in the first mode or the second mode. The controller receives, from the host device, a designation of a write destination area out of the first area and the third area. The controller writes data received from the host device to an area that corresponds to the designation out of the first area and the third area. The controller generates free blocks among the first plurality of blocks by transcribing valid data written to the first area to the second area. The controller generates free blocks among the third plurality of blocks by transcribing valid data written to the third area to the second area.

A memory system according to embodiments will be described in detail below with reference to the accompanying drawings. Note that the disclosure is not limited by these embodiments.

First Embodiment

Figure 1:
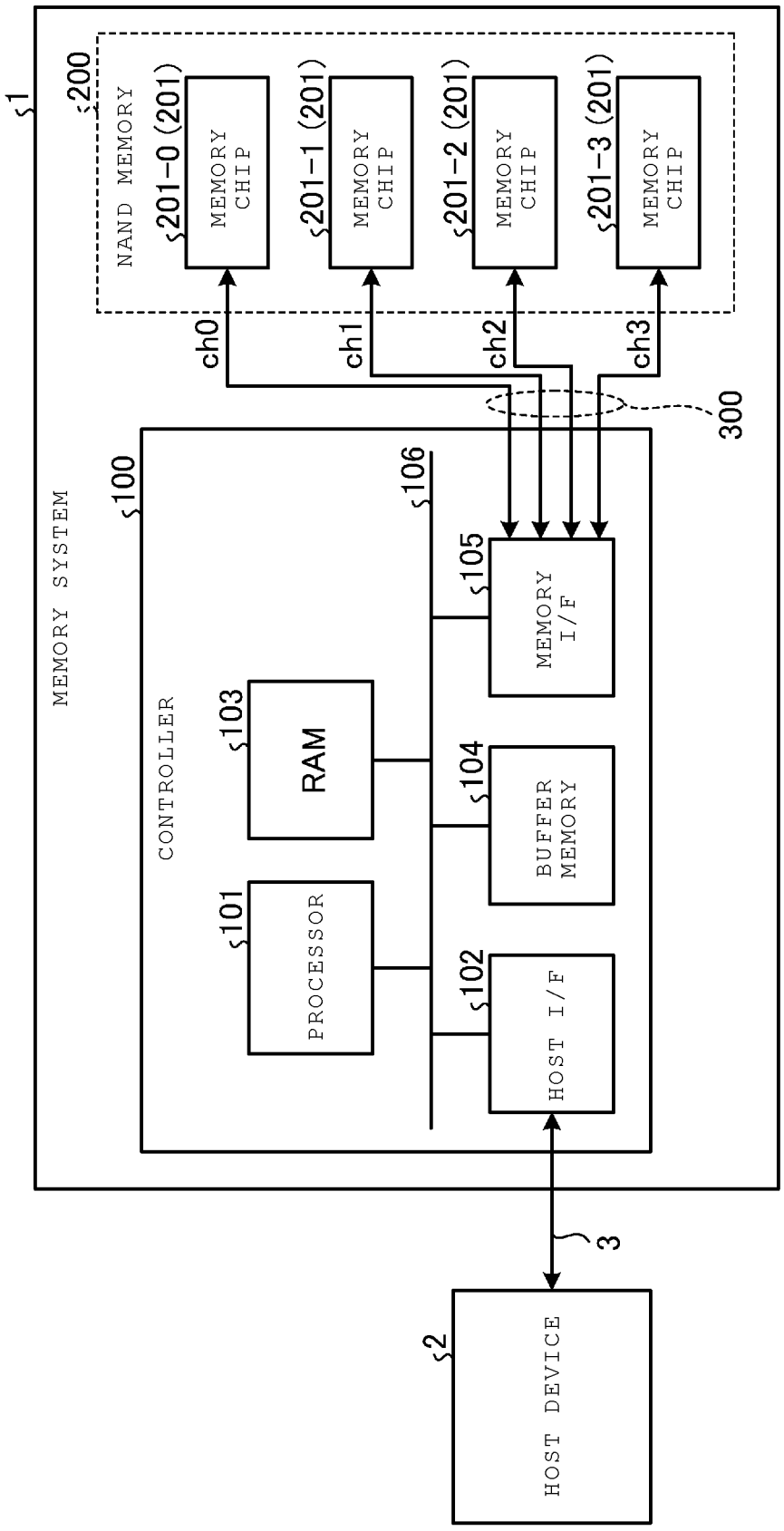
FIG. 1 is a schematic diagram illustrating an example of a configuration of a memory system according to a first embodiment.

FIG. 1 is a schematic diagram illustrating an example of a configuration of a memory system 1 according to a first embodiment.

The memory system 1 is connected to a host device 2 via a communication interface 3. The host device 2 is, for example, a processor provided in an information processing device. The information processing device is, for example, a computer such as a personal computer, a mobile phone, a smart phone, a portable music player, an imaging device, and the like. The memory system 1 is, for example, a universal flash storage (UFS) device or a solid state drive (SSD). The standard of the communication interface 3 is not limited to a specific standard.

The memory system 1 receives an access command (for example, write command or read command) from the host device 2. The memory system 1 stores user data, which is requested to be written, according to the write command. The memory system 1 transmits the user data, which is requested to be read, to the host device 2 according to the read command.

The access command contains a logical address. The memory system 1 provides the host device 2 with a logical address space. The logical address indicates a location in the address space. The host device 2 uses a logical address to designate a location to write user data or a location to read user data. In other words, the logical address is location information designated by the host device 2. An example of the logical address is a logical block address (LBA). Below, the logical address is referred to as an LBA.

The memory system 1 includes a controller 100 and a NAND flash memory (NAND memory) 200. The controller 100 is connected to the NAND memory 200 by a memory bus 300. The NAND memory 200 is an example of a non-volatile memory.

The controller 100 executes control of the NAND memory 200.

The controller 100 writes data, which is requested to be written by the host device 2, to the NAND memory 200, reads data, which is requested to be read by the host device 2, from the NAND memory 200, and sends the read data to the host device 2. That is, the controller 100 executes data transfer between the host device 2 and the NAND memory 200.

Writing data, which is requested to be written by the host device 2, to the NAND memory 200 for the first time after receiving the data from the host device 2 is referred to as a host write process. Data written to the NAND memory 200 by the host write process is referred to as host data. In addition, the amount of host data written to the NAND memory 200 per unit time is referred to as a host write amount. Note that the unit time for obtaining the host write amount, which is also used for obtaining a transcription write amount described below, may be set in any manner.

The controller 100 further executes a transcription process to transcribe data in the NAND memory 200. The transcription process may also be referred to as a garbage collection (also referred to as a compaction).

The transcription process includes an operation of reading data from the NAND memory 200 and an operation of writing the read data to the NAND memory 200. The operation of writing data to the NAND memory 200 as part of the transcription process is referred to as a transcription write operation. In addition, data written to the NAND memory 200 by the transcription write operation is referred to as transcription data. In addition, the amount of transcription data written to the NAND memory 200 per unit time is referred to as the transcription write amount. A more detailed description of the transcription process will be provided later.

Furthermore, the controller 100 can change the setting of the number of bits of data written in one memory cell of the NAND memory 200. The setting of the number of bits of data written in one memory cell is referred to as a storage mode. The storage mode that can be implemented in the memory system 1 and a method of controlling the storage mode will be described later.

The controller 100 includes a processor 101, a host interface circuit (host I/F) 102, a random access memory (RAM) 103, a buffer memory 104, a memory interface circuit (memory I/F) 105 and an internal bus 106. The processor 101, the host I/F 102, the RAM 103, the buffer memory 104, and the memory I/F 105 are electrically connected to the internal bus 106.

The controller 100 may be configured as a system-on-a-chip (SoC). Alternatively, the controller 100 may be implemented with a plurality of chips. The controller 100 may also be configured as a field-programmable gate array (FPGA) or an application specific integrated circuit (ASIC). The RAM 103 or the buffer memory 104 may be located outside the controller 100.

The host I/F 102 receives access commands, data, and the like from the host device 2. The host I/F 102 also transmits data read from the NAND memory 200 and responses to access commands, to the host device 2.

The buffer memory 104 is a memory that functions as a buffer for data transfer between the host device 2 and the NAND memory 200. The buffer memory 104 is implemented with a volatile memory such as a static random access memory (SRAM) or a dynamic random access memory (DRAM). It should be noted that the types of memory constituting the buffer memory 104 are not limited to these examples. The buffer memory 104 may be implemented with any type of non-volatile memory.

The memory I/F 105 controls an operation of writing data and the like to the NAND memory 200 and an operation of reading data and the like from the NAND memory 200, based on instructions from the processor 101.

The processor 101 is a circuit capable of executing a computer program. The processor 101 is, for example, a central process unit (CPU). The processor 101 comprehensively controls each component of the controller 100 based on a firmware program stored in advance in a predetermined location (for example, the NAND memory 200), thereby realizing various operations of the controller 100.

Note that a part or all of the processes executed by the processor 101 may be executed by a dedicated hardware circuit.

The RAM 103 is a memory that the processor 101 can use as a cache memory or a working memory. The RAM 103 is implemented with a DRAM, an SRAM, or a combination thereof. It should be noted that the type of memory constituting the RAM 103 is not limited to these examples.

The controller 100 may include any component in place of or in addition to these components. For example, the controller 100 may include a circuit that encodes data to be written to the NAND memory 200 and decodes data read from the NAND memory 200. In addition, the RAM 103 may be used as a buffer memory and the buffer memory 104 may not be implemented.

The NAND memory 200 is a memory that can store user data and the like in a non-volatile manner. The NAND memory 200 is implemented with one or more memory chips 201. Here, the NAND memory 200 includes four memory chips 201-0, 201-1, 201-2, and 201-3. The memory bus 300 has four channels ch0 to ch3, and one memory chip 201 is connected to each of the four channels ch0 to ch3. It should be noted that the number of channels constituting the memory bus 300 is not limited to four. The number of memory chips 201 connected to each channel is not limited to one.

Figure 2:
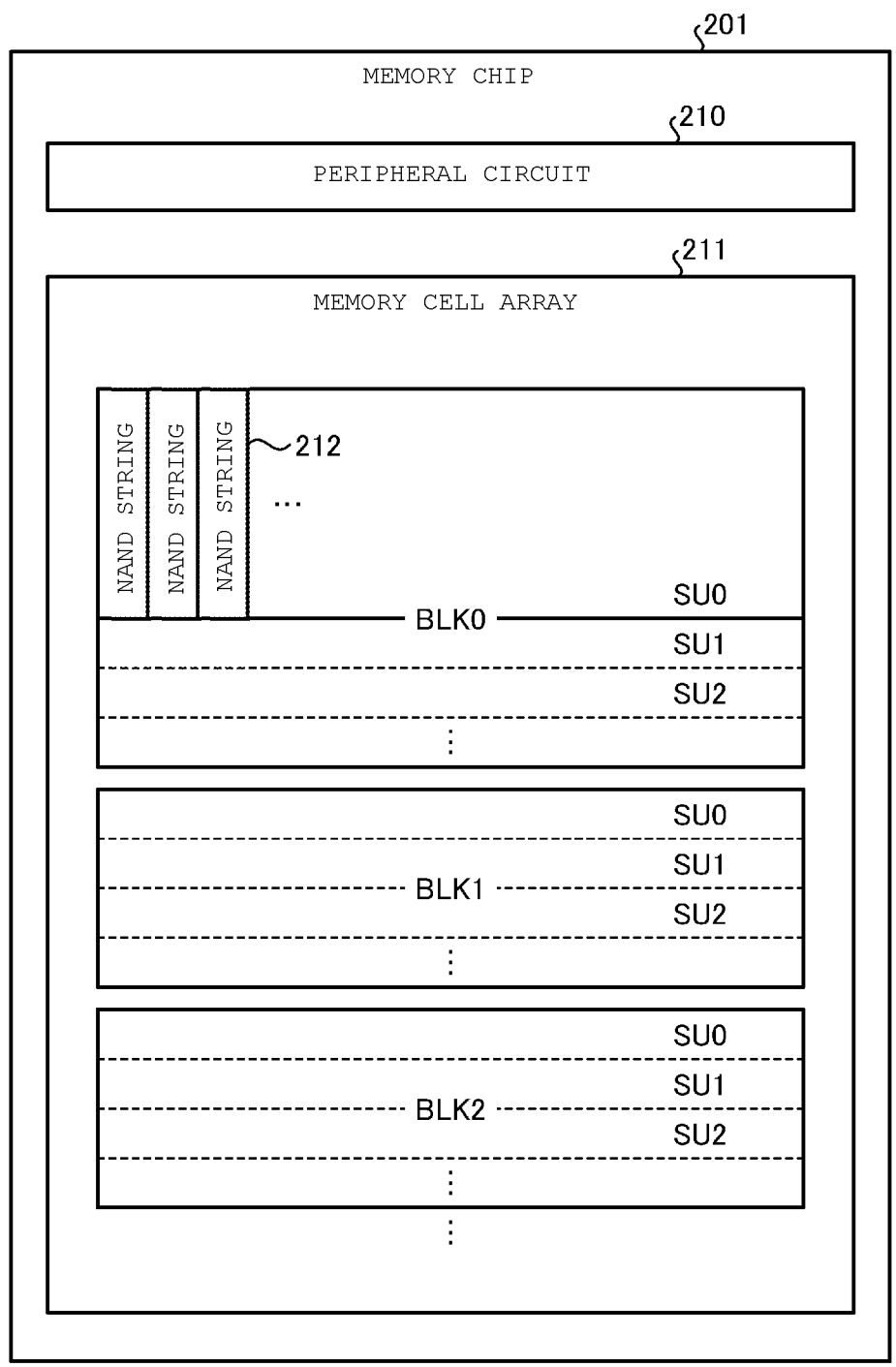
FIG. 2 is a schematic diagram illustrating an example of a configuration of a memory chip according to the first embodiment.

FIG. 2 is a schematic diagram illustrating an example of a configuration of the memory chip 201 according to the first embodiment. The memory chip 201 has a peripheral circuit 210 and a memory cell array 211.

The memory cell array 211 includes a plurality of blocks BLK (BLK0, BLK1, BLK2, . . . ). Each block BLK includes a plurality of string units SU (SU0, SU1, SU2, . . . ). Each string unit SU includes a plurality of NAND strings 212. Each NAND string 212 includes a plurality of non-volatile memory cell transistors connected in series. It should be noted that the number of NAND strings 212 in the string unit SU may be any number. The number of memory cell transistors in the NAND string 212 may be any number.

The peripheral circuit 210 includes, for example, a row decoder, a column decoder, a sense amplifier, a latch circuit, and a voltage generation circuit. The peripheral circuit 210 executes an operation on the memory cell array 211 in accordance with an instruction from the controller 100. Instructions from the controller 100 include a write instruction, a read instruction, and an erase instruction.

Figure 3:
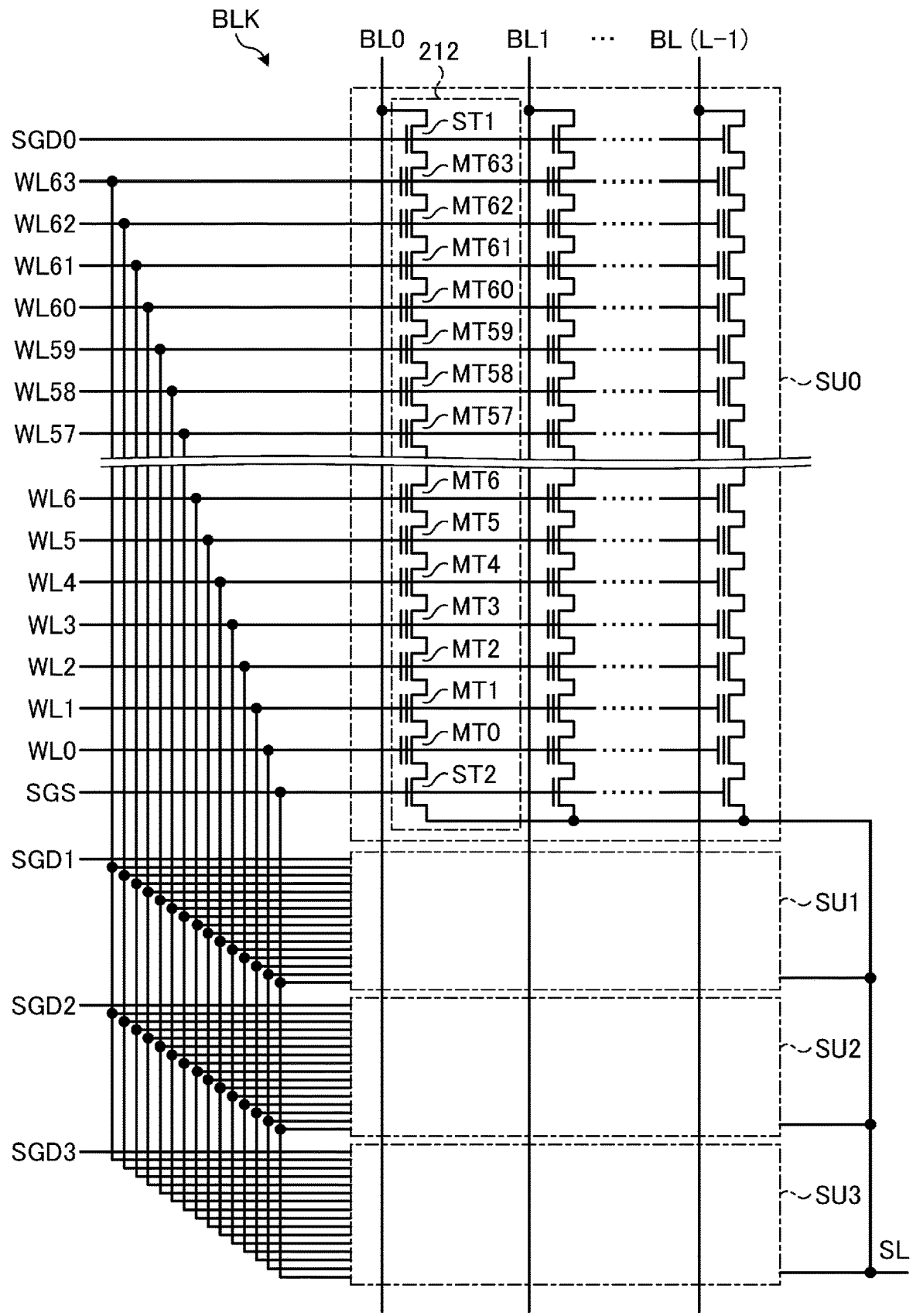
FIG. 3 is a schematic diagram illustrating a circuit configuration of a block according to the first embodiment.

FIG. 3 is a schematic diagram illustrating the circuit configuration of the block BLK according to the first embodiment. Each block BLK has the same configuration. The block BLK has, for example, four string units SU0 to SU3. Each string unit SU includes a plurality of NAND strings 212.

Each NAND string 212 includes, for example, 64 memory cell transistors MT (MT0 to MT63) and select transistors ST1 and ST2. The memory cell transistor MT includes a control gate and a charge storage layer, and stores data in a non-volatile manner. In addition, the 64 memory cell transistors MT (MT0 to MT63) are connected in series between the source of the select transistor ST1 and the drain of the select transistor ST2. Note that the memory cell transistor MT may be a metal-oxide-nitride-oxide-silicon (MONOS) type using an insulating film as a charge storage layer, or a floating gate (FG) type using a conductive film as a charge storage layer. Furthermore, the number of memory cell transistors MT in the NAND string 212 is not limited to 64.

The gates of the select transistors ST1 in each of string units SU0 to SU3 are connected to respective select gate lines SGD0 to SGD3. In contrast, the gates of the select transistors ST2 in each of the string units SU0 to SU3 are commonly connected to, for example, a select gate line SGS. Note that the gates of the select transistors ST2 in each of the string units SU0 to SU3 may be connected to different select gate lines SGS0 to SGS3 (not illustrated) for each string unit SU. Control gates of memory cell transistors MT0 to MT63 in the same block BLK are commonly connected to respective word lines WL0 to WL63.

The drains of the select transistors ST1 of NAND strings 212 in the string unit SU are connected respectively to different bit lines BL (BL0 to BL (L−1), where L is a natural number of 2 or more). In addition, the bit line BL commonly connects one NAND string 212 in each of the string units SU among the plurality of blocks BLK. Further, the sources of select transistors ST2 are commonly connected to a source line SL.

That is, the string unit SU is a set including a plurality of NAND strings 212 each connected to a different bit line BL and connected to the same select gate line SGD. Further, the block BLK is a set including a plurality of string units SU having a common word line WL. The memory cell array 211 is a set including a plurality of blocks BLK having at least one common bit line BL.

The writing and reading of data by the peripheral circuit 210 can be collectively executed for the memory cell transistors MT connected to one word line WL in one string unit SU. A group of memory cell transistors MT collectively selected in the writing and reading is referred to as a memory cell group MCG. A group of 1-bit data written to or read from one memory cell group MCG is referred to as a page.

An erase operation by the peripheral circuit 210 is executed in units of blocks BLK. That is, all data stored in one block BLK are erased together.

It should be noted that the configuration of the memory cell array 211 is not limited to the configurations illustrated in FIGS. 2 and 3. For example, the memory cell array 211 may have a configuration in which the NAND strings 212 are located two-dimensionally or three-dimensionally.

In a write operation on the memory cell array 211, the peripheral circuit 210 injects charge into the charge storage layer of each memory cell transistor MT constituting a write destination memory cell group MCG. The amount of injected charge corresponds to data to be written to each memory cell transistor MT. In a read operation on the memory cell array 211, the peripheral circuit 210 reads data corresponding to the amount of charge accumulated in the charge storage layer of each memory cell transistor MT constituting a read destination memory cell group MCG.

The writing of data to the memory cell array 211 is also called a program operation.

Data of n (n≥1) bits can be written in each memory cell transistor MT. A mode in which n is 1 is called a single-level cell (SLC) mode. When n-bit data is written in each memory cell transistor MT, the storage capacity per memory cell group MCG is equal to the size of n pages. A mode in which n is 2 is called a multi-level cell (MLC) mode. A mode in which n is 3 is called a triple level cell (TLC) mode. A mode in which n is 4 is called a quad level cell (QLC) mode.

The threshold voltage of each memory cell transistor MT is controlled in a certain range by the peripheral circuit 210. The controllable range of threshold voltages is divided into divisions of 2 raised to the power of n, and a different n-bit value is assigned to each of the divisions.

Figure 4:
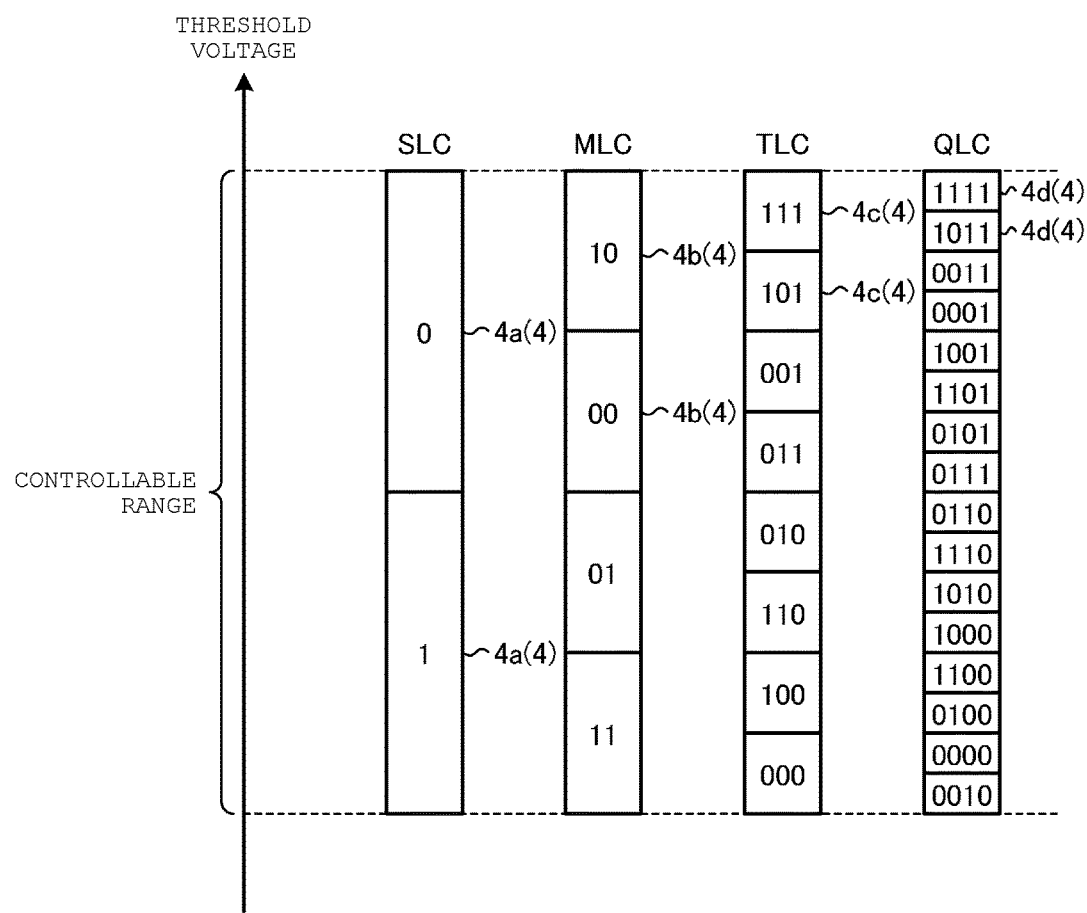
FIG. 4 is a diagram illustrating divisions in the first embodiment in each case of an SLC mode, an MLC mode, a TLC mode, and a QLC mode.

FIG. 4 is a diagram illustrating divisions in the first embodiment in each case of the SLC mode, the MLC mode, the TLC mode, and the QLC mode. As illustrated in FIG. 4, the threshold voltage range (controllable range) is divided into a plurality of divisions 4.

For example, in the SLC mode, the range of threshold voltages is divided into two divisions 4a. In the MLC mode, the range of threshold voltages is divided into four divisions 4b. In the TLC mode, the range of threshold voltages is divided into eight divisions 4c. In the QLC mode, the range of threshold voltages is divided into sixteen divisions 4d.

As the number of bits of data stored in one memory cell increases, the range of each division 4 becomes narrower. Values of the corresponding number of bits are assigned to the divisions 4, respectively. In the SLC mode, "0" is assigned to the division 4a on the high voltage side and "1" is assigned to the division 4a on the low voltage side. In the MLC mode, "10", "00", "01", and "11" are assigned respectively to the four divisions 4b in descending order of the threshold voltage. In the TLC mode, "111", "101", "001", "011", "010", "110", "100", and "000" are assigned respectively to the eight divisions 4c in descending order of the threshold voltage. In the QLC mode, "1111", "1011", "0011", "0001", "1001", "1101", "0101", "0111", "0110", "1110", "1010", "1000", "1100", "0100", "0000", and "0010" are assigned respectively to the sixteen divisions 4d in descending order of the threshold voltage. It should be noted that the method of assigning values to each division 4 is not limited to these examples.

In a write operation on the memory cell array 211, the peripheral circuit 210 injects charge whose amount corresponds to the division 4 to which the write target value is assigned, into the charge storage layer of each memory cell transistor MT constituting the write destination memory cell group MCG.

In a read operation on the memory cell array 211, the peripheral circuit 210 determines the division 4 to which the threshold voltage of each memory cell transistor MT constituting the read destination memory cell group MCG belongs, and outputs the values assigned to the divisions 4 acquired by the determination as the read data.

In an erase operation on the memory cell array 211, the peripheral circuit 210 applies an erase voltage to the substrate side of the memory cell array 211. Then, the peripheral circuit 210 conducts all the word lines WL of the block BLK, which is an erase target, to the ground potential. Then, in each memory cell transistor MT in the selected block BLK, the charge stored in the charge storage layer is discharged. As a result, the state of each memory cell transistor MT in the selected block BLK transitions to a state where data is considered erased (that is, the division 4 on the lowest voltage side).

The memory system 1 is configured such that the storage mode can be set or changed. More specifically, the controller 100 sets or changes the storage mode of each block BLK from any of a first mode in which data of a first number of bit is written in one memory cell and a second mode in which data of a second number (where the second number is larger than the first number) of bit is written in one memory cell. In the following description, it is assumed that the first mode is the SLC mode and the second mode is the TLC mode. It should be noted that each of the first mode and the second mode is not limited to this example. Further, the minimum storage area for which the storage mode is individually set is not limited to the block BLK. For example, the storage mode may be individually set in units of super blocks each including a plurality of blocks BLK.

Figure 5:
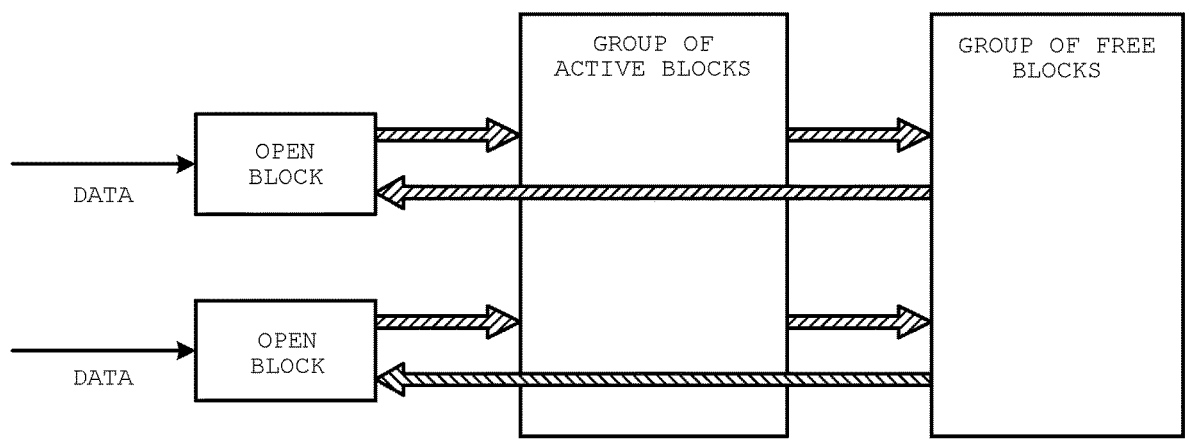
FIG. 5 is a diagram illustrating an example of state transition of blocks according to the first embodiment.

Next, state transition of the blocks BLK will be described. FIG. 5 is a diagram illustrating an example of state transition of the blocks BLK according to the first embodiment. A hatched arrow indicates the direction of transition of the state of the block BLK, and a solid arrow indicates the direction of data movement.

The states of the block BLK can be at least an open block (also referred to as an input block), an active block, and a free block. Hereinafter, the open block may mean a block BLK which is in an open block state. In addition, the active block may mean a block BLK which is in an active block state. Further, the free block may mean a block BLK which is in a free block state.

The open block is a block BLK which is being written and for which write operations on all the memory cell groups MCG are not completed. In other words, the open block is a block BLK that includes an area where data can be written.

The active block is a block BLK for which write operations on all the memory cell groups MCG are completed. The active block is also a block BLK that cannot yet be reused. Of the blocks BLK for which the write operations are completed, a block BLK in which valid data is stored is managed as the active block. Here, reusing refers to transitioning the state of the block BLK to an open block.

The free block is a block BLK for which write operations on all the memory cell groups MCG are completed but in which valid data is not stored. The free block is a reusable block BLK.

For example, after data for one block BLK is written to an open block, that open block transitions to an active block. The state of data stored in the active block is either valid or invalid.

When some data (referred to as first data) is stored in an active block, if the host device 2 designates, to send second data, the same LBA as the LBA designated when the first data was sent, the controller 100 writes the second data to an empty memory cell group MCG of the open block. The controller 100 then manages the first data stored in the active block as invalid data. Therefore, active blocks may contain both valid data and invalid data.

It is noted that designating the same LBA as the LBA designated when the host device 2 sent old data to the memory system 1 and sending new data are referred to as a rewrite process.

The active block may transition to a free block by the transcription process. The transcription process is a process of transcribing valid data stored in an active block to an open block and invalidating all data stored in the active block which is a transcription source. As a result, the active block which is the transcription source transitions to a free block. That is, the transcription process can be considered as a process of generating a free block. It should be noted that transcription may also be referred to as transfer, relocation, or move.

A free block transitions to an open block after the stored data (that is, invalid data) is erased.

It is noted that valid data means that the location in the block BLK in which it is stored is associated with any LBA. Invalid data means that the location in the block BLK in which it is stored is not associated with any LBA. In addition, an empty state here refers to a state where neither invalid data nor valid data is stored. That is, the empty memory cell group MCG is an area available for writing data. It should be noted that the controller 100 maintains and updates mappings between the LBAs and the locations in the block BLK.

Both the host data and the transcription data may be written to the same open block in common. An open block into which the host data is written and an open block into which the transcription data is written may be separately prepared.

In the memory system 1 in which host write processes are not executed at all, all blocks BLK except open blocks are in a free block state. When a host write process is initiated, transition from an open block to an active block and transition from a free block to an open block are initiated. Therefore, the number of active blocks increases and the number of free blocks decreases. When free blocks are depleted, a transcription process is initiated to maintain the number of free blocks larger than a lower limit (for example, one). It should be noted that the trigger for initiating the transcription process is not limited thereto. By the transcription process, the block BLK which was an active block becomes a new free block.

Next, the configuration of the NAND memory 200 of the first embodiment will be described.

As the number of bits of data written in one memory cell increases, the capacity of the memory system 1 increases and cost per bit of the memory system 1 can be reduced. On the other hand, since the range of each division 4 is narrowed, it becomes necessary to precisely control the threshold voltage during a write operation, and the time required for the write operation becomes longer. That is, as the number of bits of data written in one memory cell increases, the write performance deteriorates.

In addition, the threshold voltage of a memory cell may fluctuate over time or due to various factors. When the threshold voltage of a memory cell fluctuates and exceeds the boundary of division 4, data read from the memory cell becomes different from data that was written thereto. When such different data is read, the data is detected as an error and corrected by the error correction function of the controller 100.

Further, as the number of P/E cycles increases, the threshold voltage of a memory cell tends to fluctuate and there is a limit to the correction capability of the error correction function of the controller 100. Therefore, an upper limit is set on the number of P/E cycles to ensure that correct data is obtained by the error correction function. When the number of P/E cycles of a memory cell reaches the upper limit, the memory cell is considered unusable because a required level of reliability is not guaranteed. As the number of bits of data written in one memory cell increases, the range of each division 4 becomes narrower, an error is likely to occur, and thus the upper limit of the number of P/E cycles becomes small.

In the memory system 1, in addition to host write processes, transcription write operations are executed to the NAND memory. The number of P/E cycles is increased not only by the host write processes, but also by the transcription write operations. When a ratio of the transcription write amount to the host write amount is large, compared to a case where the ratio of the transcription write amount to the host write amount is small, the lifetime of the memory system 1, that is, a time period until the number of P/E cycles reaches the upper limit, becomes shorter. Therefore, it is desirable to maintain the ratio of the transcription write amount to the host write amount as small as possible.

In the first embodiment, the NAND memory 200 has a configuration described below in order to maintain the ratio of the transcription write amount to the host write amount small while preventing deterioration in write performance.

Figure 6:
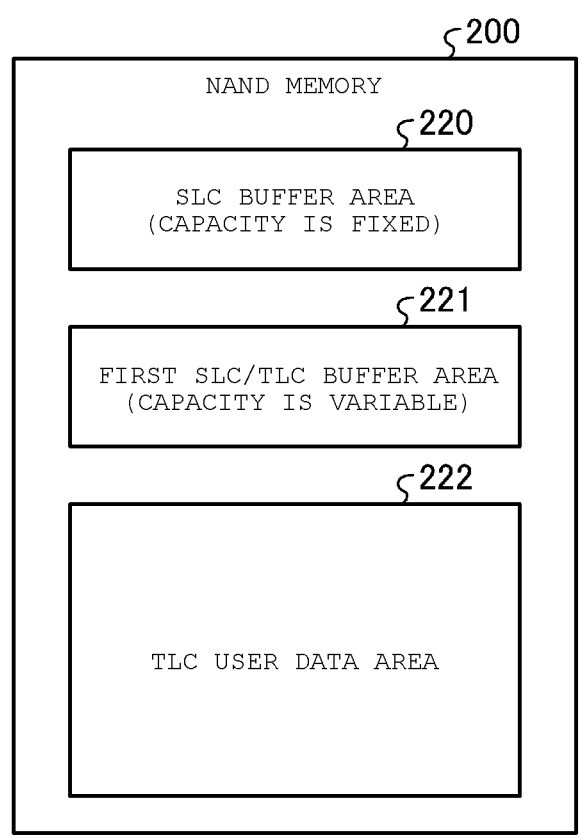
FIG. 6 is a schematic diagram illustrating an example of a configuration of a NAND memory according to the first embodiment.
Figure 7:
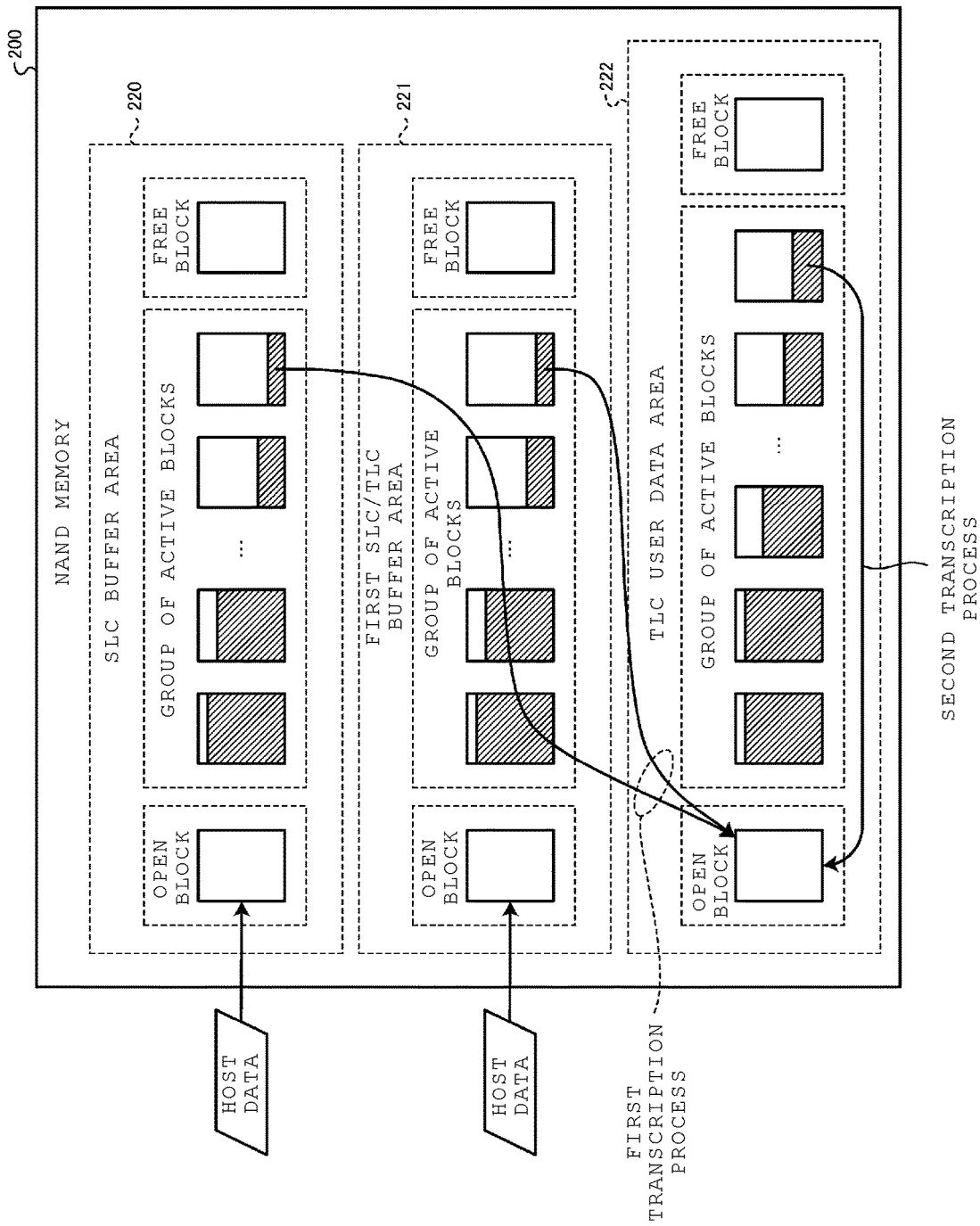
FIG. 7 is a schematic diagram illustrating an example of a transcription process in the NAND memory according to the first embodiment.

FIG. 6 is a schematic diagram illustrating an example of a configuration of the NAND memory 200 according to the first embodiment. FIG. 7 is a schematic diagram illustrating an example of the transcription process in the NAND memory 200 according to the first embodiment.

As illustrated in FIG. 6, the NAND memory 200 includes: an SLC buffer area 220 composed only of blocks BLK set to be used in the first mode (here, the SLC mode); a first SLC/TLC buffer area 221 that can include blocks BLK set to be used in the second mode (here, the TLC mode) in addition to blocks BLK set to be used in the first mode; and a TLC user data area 222 composed only of blocks BLK set to be used in the second mode.

A block BLK to be used in an XLC mode (where X is S, M, T, or Q) is hereinafter referred to as an XLC block.

As illustrated in FIG. 7, each of the SLC buffer area 220, the first SLC/TLC buffer area 221, and the TLC user data area 222 includes open blocks and one or more free blocks.

The SLC mode completes a write operation faster than the TLC mode. Therefore, in order to improve the throughput of the memory system 1 viewed from the host device 2, the controller 100 writes host data to open blocks in the SLC buffer area 220 or the first SLC/TLC buffer area 221.

A write operation on an open block is considered complete when the open block is filled with host data in the SLC buffer area 220 or the first SLC/TLC buffer area 221. Upon completion of the write operation on an open block, that open block transitions to an active block. Then, one of the free blocks belonging to the same area as the area to which the active block transitioned from the open block belongs is set as a new open block. Then, when a predetermined condition, such as the number of free blocks reaching the set lower limit, is satisfied, one of the active blocks is selected, and the valid data in the selected active block is moved to an open block in the TLC user data area 222 by a transcription process. The selected active block, that is, the active block which is a movement source of valid data transitions to a state where valid data is not stored, that is, a free block state.

In this manner, host data received from the host device 2 is buffered in the SLC buffer area 220 or the first SLC/TLC buffer area 221. Valid data among the data buffered in the SLC buffer area 220 or the first SLC/TLC buffer area 221 is moved to the TLC user data area 222.

Here, a process of moving valid data from the SLC buffer area 220 or the first SLC/TLC buffer area 221 to the TLC user data area 222 is referred to as a first transcription process.

In the TLC user data area 222, a write operation on an open block is considered complete when the open block is filled with transcription data. Upon completion of a write operation on an open block, that open block transitions to an active block and one of the free blocks transitions to a new open block. Then, when a predetermined condition, such as the number of free blocks reaching the set lower limit, is satisfied, one of the active blocks is selected, and the valid data in the selected active block is moved to an open block by a transcription process. The selected active block, that is, the active block which is a movement source of valid data transitions to a free block. Such a process of moving valid data from an active block to an open block to generate a free block in the TLC user data area 222 is referred to as a second transcription process.

The data written to the SLC buffer area 220 or the first SLC/TLC buffer area 221 is either transcribed to the TLC user data area 222 by the first transcription process, or invalidated without the transcription process.

A case where data is invalidated without the transcription process includes, for example, a case where data is invalidated by a rewrite process (that is, a host write process for designating the same LBA as already written data), and a case where a mapping between the LBA and the location of already written data is invalidated by a TRIM command. The TRIM command includes an LBA designation. The TRIM command is a command for notifying the memory system of the fact that the data located at the designated LBA is unnecessary. An operation of invalidating the mapping between the LBA and the location of data by the TRIM command is referred to as a trim operation.

In other words, the frequency of execution of the first transcription process is affected by the frequency of a rewrite process or issuance of the TRIM command by the host device 2. The frequency of the rewrite process or the trim operation may vary from data to data. The state of data that tends to undergo the rewrite process or the trim operation in a short period of time is referred to as hot. The state of data that tends not to undergo the rewrite process or the trim operation for an extended period of time is referred to as cold.

In the first embodiment, the controller 100 is configured to be able to receive a write destination designation command and an invalidation command from the host device 2. The write destination designation command is a command for instructing to write host data to the first SLC/TLC buffer area 221 out of the SLC buffer area 220 and the first SLC/TLC buffer area 221. The invalidation command is a command for instructing to invalidate the designation of the write destination by the write destination designation command.

Figure 8:
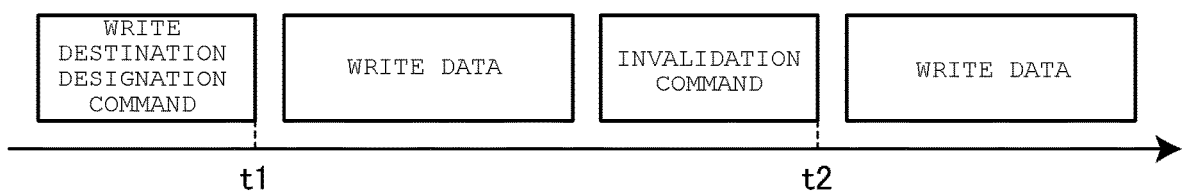
FIG. 8 is a schematic diagram illustrating an example of a method of using a write destination designation command according to the first embodiment.

FIG. 8 is a schematic diagram illustrating an example of a method of using the write destination designation command according to the first embodiment.

For example, the host device 2 transmits a write destination designation command to the memory system 1 (time t1), and then transmits one or more pieces of write data. The host device 2 then transmits an invalidation command to the memory system 1 (time t2).

When the controller 100 receives the commands and the write data in this order, during the period from time t1, which is a timing at which the write destination designation command is received, to time t2, which is a timing at which the invalidation command is received, the controller 100 interprets that the first SLC/TLC buffer area 221 is designated as the write destination for all the received write data. During the period from time t2, which is the timing at which the invalidation command is received, to the next reception of the write destination designation command, the controller 100 interprets that the SLC buffer area 220 is designated as the write destination for all the received write data.

The host device 2 uses such commands to control the memory system 1 such that, for example, hot data is written to the first SLC/TLC buffer area 221 and cold data is written to the SLC buffer area 220. In this manner, by collecting data with a high probability of being invalidated by a rewrite process or a trim operation in the first SLC/TLC buffer area 221, the amount of data transcribed from the first SLC/TLC buffer area 221 to the TLC user data area 222 is reduced, and thereby reducing the total transcription data amount.

It should be noted that some communication standards between the host device 2 and the memory system 1 may have command values with undefined operations. With such standards, vendors can assign the command values of undefined operations to any operation. Such command values that vendors can assign to any operation are called vendor-specific command values. Vendors may use two vendor-specific command values as the write destination designation command and the invalidation command. It should be noted that the write destination designation command and the invalidation command may be defined by a standard.

Note that, the write destination designation command and the invalidation command are examples of a command for designating the write destination out of the SLC buffer area 220 and the first SLC/TLC buffer area 221. Commands for designating the write destination are not limited to these examples.

As the capacity of the first SLC/TLC buffer area 221 increases, a period from the time when data is written to the first SLC/TLC buffer area 221 to the time when the data becomes the target of the first transcription process becomes longer. Therefore, as the capacity of the first SLC/TLC buffer area 221 increases, the probability that data will be invalidated by a rewrite process or a trim operation increases, and the amount of data transcribed from the first SLC/TLC buffer area 221 to the TLC user data area 222 is reduced.

Accordingly, in the first embodiment, further, the capacity of the first SLC/TLC buffer area 221 is configured to be variable. When there are enough available blocks BLK, that is, free blocks in the TLC user data area 222, some of them are added to the first SLC/TLC buffer area 221 as TLC blocks or SLC blocks. Therefore, when there are many available blocks BLK in the TLC user data area 222, the capacity of the first SLC/TLC buffer area 221 can be increased, thereby preventing the transcription write amount in the first transcription process.

A block BLK added to the first SLC/TLC buffer area 221 as an SLC block transitions to an open block and then undergoes a host write process in the SLC mode. A block BLK added to the first SLC/TLC buffer area 221 as a TLC block transitions to an open block and then undergoes a host write process in the TLC mode. When the first SLC/TLC buffer area 221 includes both blocks BLK added as SLC blocks and blocks BLK added as TLC blocks, the controller 100 preferentially transitions the block BLK added as an SLC block to an open block.

In the first embodiment, it is assumed that the capacity of the SLC buffer area 220 is fixed.

Next, the operation of the memory system 1 of the first embodiment will be described.

Figure 9:
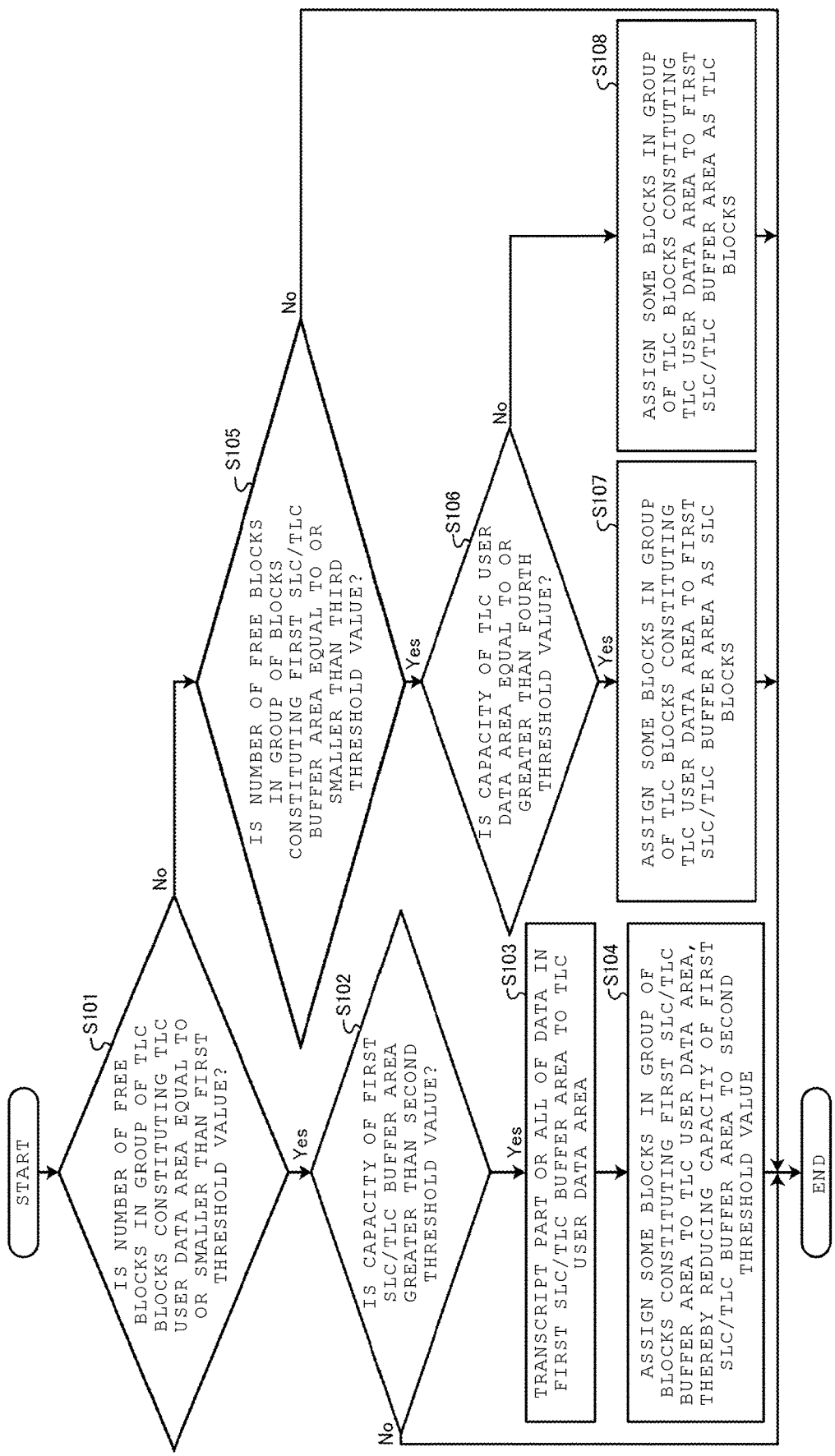
FIG. 9 is a flow chart illustrating an example of an operation of controlling a first SLC/TLC buffer area according to the first embodiment.

FIG. 9 is a flow chart illustrating an example of an operation of controlling the first SLC/TLC buffer area 221 according to the first embodiment. A series of operations illustrated in this drawing are executed a plurality of times at different timings. A series of operations illustrated in this drawing may be executed periodically or triggered by any event.

First, the processor 101 determines whether the number of free blocks among the TLC blocks constituting the TLC user data area 222 is equal to or smaller than a first threshold value (S101). As described above, when there are enough free blocks in the TLC user data area 222, some blocks BLK in the group of blocks BLK constituting the TLC user data area 222 are added to the first SLC/TLC buffer area 221. The first threshold value is a threshold value for determining whether to return a block already added to the first SLC/TLC buffer area 221 to the TLC user data area 222, and can be determined in any manner.

When the number of free blocks among the TLC blocks constituting the TLC user data area 222 is equal to or smaller than the first threshold value (S101: Yes), the processor 101 determines whether the capacity of the first SLC/TLC buffer area 221 is greater than a second threshold value (S102). Similar to the first threshold value, the second threshold value is a threshold value for determining whether to return a block already added to the first SLC/TLC buffer area 221 to the TLC user data area 222, and can be determined in any manner. Here, it is assumed that the capacity of the first SLC/TLC buffer area 221 is controlled not to fall below the set minimum value.

When the capacity of the first SLC/TLC buffer area 221 is greater than the second threshold value (S102: Yes), the processor 101 transcribes a part or all of the data in the first SLC/TLC buffer area 221 to the TLC user data area 222 by the first transcription process (S103). Then, the processor 101 assigns some blocks in the group of the blocks BLK constituting the first SLC/TLC buffer area 221 to the TLC user data area 222, thereby reducing the capacity of the first SLC/TLC buffer area 221 to the second threshold value (S104).

At step S103, the processor 101 calculates, for example, the number of blocks BLK required to be reduced in order to reduce the capacity of the first SLC/TLC buffer area 221 to the second threshold value. Then, the calculated number of blocks BLK are selected from the active blocks or free blocks constituting the first SLC/TLC buffer area 221, and the valid data in the selected blocks BLK are transcribed to the TLC user data area 222. It should be noted that, when there is no valid data in the selected block BLK (that is, when the selected block BLK is a free block), the processor 101 may skip the process of step S103. After the process of step S103 or after skipping the process of step S103, the processor 101 assigns the selected block BLK to the TLC user data area 222, thereby moving the selected block BLK from the first SLC/TLC buffer area 221 to the TLC user data area 222.

When the capacity of the first SLC/TLC buffer area 221 is not greater than the second threshold value (S102: No), or after step S104, the operation of controlling the first SLC/TLC buffer area 221 ends.

When the number of free blocks among the TLC blocks constituting the TLC user data area 222 is not equal to or smaller than the first threshold value (S101: No), the processor 101 determines whether the number of free blocks in the group of blocks BLK constituting the first SLC/TLC buffer area 221 is equal to or smaller than a third threshold value (S105). The third threshold value is a threshold value for determining whether to increase the capacity of the first SLC/TLC buffer area 221, and can be determined in any manner.

When the number of free blocks in the group of blocks BLK constituting the first SLC/TLC buffer area 221 is equal to or smaller than the third threshold value (S105: Yes), the processor 101 determines whether the capacity of the TLC user data area 222 is equal to or greater than a fourth threshold value (S106). The fourth threshold value is a threshold value for determining whether a block BLK to be moved from the TLC user data area 222 to the first SLC/TLC buffer area 221 is moved as a TLC block or as an SLC block, and can be determined in any manner.

When the capacity of the TLC user data area 222 is equal to or greater than the fourth threshold value (S106: Yes), it can be considered that there are abundant blocks BLK constituting the TLC user data area 222. Therefore, the processor 101 assigns some free blocks in the group of blocks BLK constituting the TLC user data area 222 to the first SLC/TLC buffer area 221 as SLC blocks (S107).

When the capacity of the TLC user data area 222 is not equal to or greater than the fourth threshold value (S106: No), the processor 101 assigns some free blocks in the group of blocks BLK constituting the TLC user data area 222 to the first SLC/TLC buffer area 221 as TLC blocks (S108).

After step S107 or step S108, the operation of controlling the first SLC/TLC buffer area 221 ends.

Here, it is described that, when the number of free blocks among the TLC blocks constituting the TLC user data area 222 is equal to the first threshold value in the determination process of step S101, the processor 101 executes the process of step S102. However, when the number of free blocks among the TLC blocks constituting the TLC user data area 222 is equal to the first threshold value, the processor 101 may execute the process of step S105.

Further, it is described that, when the capacity of the first SLC/TLC buffer area 221 is equal to the second threshold value in the determination process of step S102, the processor 101 ends the operation. However, when the capacity of the first SLC/TLC buffer area 221 is equal to the second threshold value, the processor 101 may execute the process of step S103.

Further, it is described that, when the number of free blocks in the group of blocks BLK constituting the first SLC/TLC buffer area 221 is equal to the third threshold value in the determination process of step S105, the processor 101 executes the process of step S106. However, when the number of free blocks in the group of blocks BLK constituting the first SLC/TLC buffer area 221 is equal to the third threshold value, the processor 101 may end the operation.

Further, it is described that, when the capacity of the TLC user data area 222 is equal to the fourth threshold value in the determination process of step S106, the processor 101 executes the process of step S107. However, when the capacity of the TLC user data area 222 is equal to the fourth threshold value, the processor 101 may execute the process of step S108.

Figure 10:
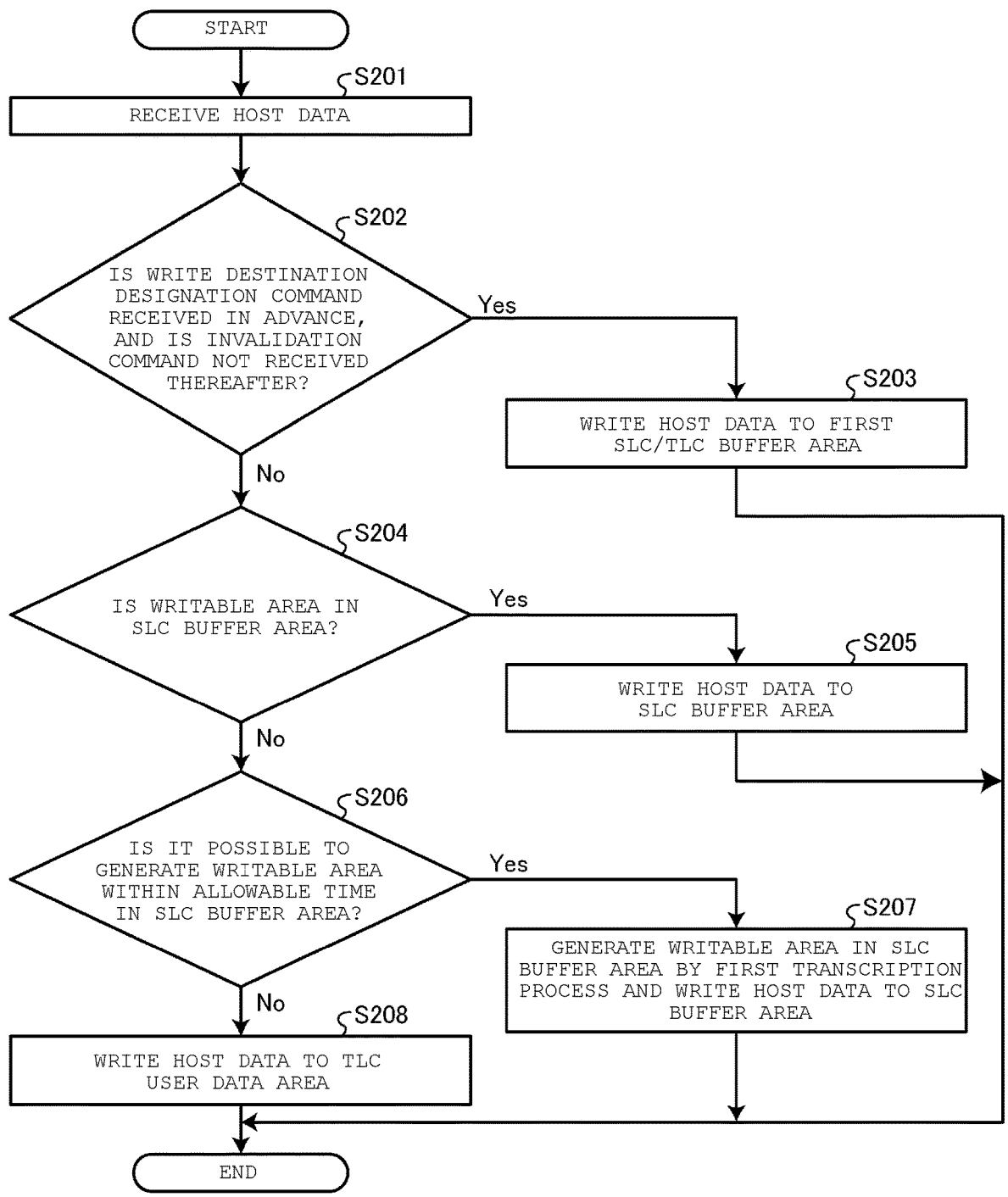
FIG. 10 is a flow chart illustrating an example of an operation of writing host data to the NAND memory according to the first embodiment.

FIG. 10 is a flow chart illustrating an example of an operation of writing host data to the NAND memory 200 according to the first embodiment.

When the memory system 1 receives host data from the host device 2 (S201), the processor 101 determines whether a write destination designation command is received in advance and whether an invalidation command is received thereafter (S202).

When the write destination designation command is received in advance and the invalidation command is not received after that (S202: Yes), the processor 101 controls the controller 100 to write the host data to the first SLC/TLC buffer area 221 (S203).

When the write destination designation command is not received in advance, or when the invalidation command is received after the write destination designation command was received (S202: No), the processor 101 determines whether there is a writable area in the SLC buffer area 220 (S204).

Specifically, for example, the processor 101 determines whether the total capacity of the area in open blocks to which new data can be written and free blocks is equal to or greater than the size of the host data. When the total capacity is equal to or greater than the size of the host data, it is determined that there is a writable area in the SLC buffer area 220. When the total capacity is less than the size of the host data, it is determined that there is no writable area in the SLC buffer area 220.

When there is a writable area in the SLC buffer area 220 (S204: Yes), the processor 101 controls the controller 100 to write host data to the SLC buffer area 220 (S205).

When there is no writable area in the SLC buffer area 220 (S204: No), the processor 101 determines whether it is possible to generate a writable area in a preset allowable time by the first transcription process using the SLC buffer area 220 as the transcription source (S206).

When generating a writable area by the first transcription process, it is necessary not only to transcribe data, but also to perform an erase operation on a transcription source block that has become a free block by transcription. In addition, the erase operation takes much time as compared with mere transcription of data. In order to prevent deterioration of host write performance as much as possible, the processor 101 of the first embodiment estimates the time required for a process of generating a writable area, including transcription and erase operations, and determines whether the estimated time is in the allowable time set in advance.

When the writable area can be generated in the allowable time (S206: Yes), the processor 101 controls the controller 100 to generate the writable area in the SLC buffer area 220 by the first transcription process and write the host data to the SLC buffer area 220 (S207).

When the writable area cannot be generated in the allowable time (S206: No), the processor 101 controls the controller 100 to write the host data to the TLC user data area 222 (S208).

After steps S203, S205, S207, or S208, the operation of writing host data to the NAND memory 200 ends.

In this manner, according to the first embodiment, the NAND memory 200 includes: the SLC buffer area 220 composed only of blocks BLK used in the SLC mode, which is the first mode; the first SLC/TLC buffer area 221 including blocks BLK used in the SLC mode or the TLC mode, which is the second mode; and the TLC user data area 222 composed only of blocks BLK used in the TLC mode. The controller 100 can receive a write destination designation command, which is a command capable of designating a buffer destination out of the SLC buffer area 220 and the first SLC/TLC buffer area 221. The controller 100 buffers the data received from the host device 2 in an area that corresponds to the write destination designation command out of the SLC buffer area 220 and the first SLC/TLC buffer area 221.

Accordingly, the host device 2 uses the write destination designation command to make it possible to control the memory system 1 such that, for example, hot data is written to the first SLC/TLC buffer area 221 and cold data is written to the SLC buffer area 220. In this manner, by collecting data with a high probability of being invalidated by a rewrite process or a trim operation in the first SLC/TLC buffer area 221, the amount of data transcribed from the first SLC/TLC buffer area 221 to the TLC user data area 222 is reduced, and it becomes possible to extend the lifetime of the memory system 1. In other words, it is possible for the host device 2 to take part in reducing the transcription data amount and adopt a usage method of extending the lifetime of the memory system 1. Therefore, the convenience of the memory system 1 is high for the host device 2.

Moreover, according to the first embodiment, as described with reference to FIG. 9, when the number of free blocks in the group of blocks BLK constituting the TLC user data area 222 is equal to or smaller than the first threshold value and the capacity of the first SLC/TLC buffer area 221 is greater than the second threshold value, the controller 100 assigns at least one block BLK in the group of blocks BLK constituting the first SLC/TLC buffer area 221 to the TLC user data area 222 to increase the capacity of the TLC user data area 222.

It should be noted that, when the number of free blocks in the group of blocks BLK constituting the TLC user data area 222 is smaller than the first threshold value, the controller 100 assigns at least one block BLK in the group of blocks BLK constituting the first SLC/TLC buffer area 221 to the TLC user data area 222 to increase the capacity of the TLC user data area 222.

Moreover, when the number of free blocks in the group of blocks BLK constituting the TLC user data area 222 is larger than the first threshold value and the number of free blocks in the group of blocks BLK constituting the first SLC/TLC buffer area 221 is equal to or smaller than the third threshold value, the controller 100 assigns at least one block BLK in the group of blocks BLK constituting the TLC user data area 222 to the first SLC/TLC buffer area 221 to increase the capacity of the first SLC/TLC buffer area 221.

In this manner, the controller 100 dynamically changes the assignment destination of a block BLK between the TLC user data area 222 and the first SLC/TLC buffer area 221 according to the number of free blocks in the group of blocks BLK constituting the TLC user data area 222 and the number of free blocks in the group of blocks BLK constituting the first SLC/TLC buffer area 221.

As described above, as the capacity of the first SLC/TLC buffer area 221 increases, the probability that data will be invalidated by a rewrite process or a trim operation increases, and the amount of data transcribed from the first SLC/TLC buffer area 221 to the TLC user data area 222 is reduced. The capacity of the first SLC/TLC buffer area 221 is variable, and the capacity of the first SLC/TLC buffer area 221 can be increased according to the usage of the TLC user data area 222. Therefore, it is possible to flexibly reduce the transcription write amount by the first transcription process.

Further, according to the first embodiment, when the number of free blocks in the group of blocks BLK constituting the TLC user data area 222 is larger than the first threshold value, and the number of free blocks in the group of blocks BLK constituting the first SLC/TLC buffer area 221 is equal to or smaller than the third threshold value, the processor 101 changes the storage mode of a block BLK assigned to the first SLC/TLC buffer area 221 according to the comparison between the capacity of the TLC user data area 222 and the fourth threshold value. Specifically, when the capacity of the TLC user data area 222 is equal to or greater than the fourth threshold value, the processor 101 assigns at least one block BLK in the group of blocks BLK constituting the TLC user data area 222 to the first SLC/TLC buffer area 221 as SLC blocks. When the capacity of the TLC user data area 222 is less than the fourth threshold value, the processor 101 assigns at least one block BLK in the group of blocks BLK constituting the TLC user data area 222 to the first SLC/TLC buffer area 221 as TLC blocks.

In other words, when the capacity of the TLC user data area 222 is not sufficient, by adding TLC blocks to the first SLC/TLC buffer area 221, the transcription write amount by the first transcription process can be reduced. When the capacity of the TLC user data area 222 is sufficient, by adding SLC blocks to the first SLC/TLC buffer area 221, the transcription write amount by the first transcription process can be reduced and the write performance of the host write can be improved.

Modification Example 1 of First Embodiment

In addition to the SLC buffer area 220, the first SLC/TLC buffer area 221, and the TLC user data area 222, the NAND memory 200 may be provided with another buffer area.

Figure 11:
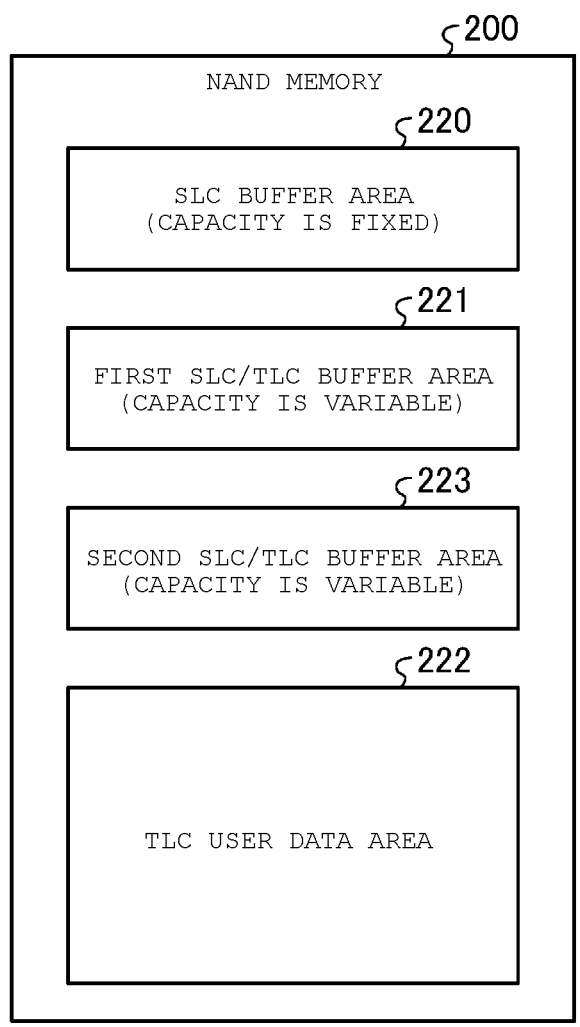
FIG. 11 is a schematic diagram illustrating an example of a configuration of a NAND memory according to Modification Example 1 of the first embodiment.

According to Modification Example 1 of the first embodiment, as illustrated in FIG. 11, the NAND memory 200 includes, as an example, the SLC buffer area 220, the first SLC/TLC buffer area 221, a second SLC/TLC buffer area 223, and the TLC user data area 222.

Similarly to the first SLC/TLC buffer area 221, the second SLC/TLC buffer area 223 is a variable-capacity buffer area that can include not only SLC blocks but also TLC blocks. The process of changing the capacity of the second SLC/TLC buffer area 223 is similar to the process of changing the capacity of the first SLC/TLC buffer area 221, for example.

It should be noted that the process of changing the capacity of the second SLC/TLC buffer area 223 may be different from the process of changing the capacity of the first SLC/TLC buffer area 221.

Figure 12:
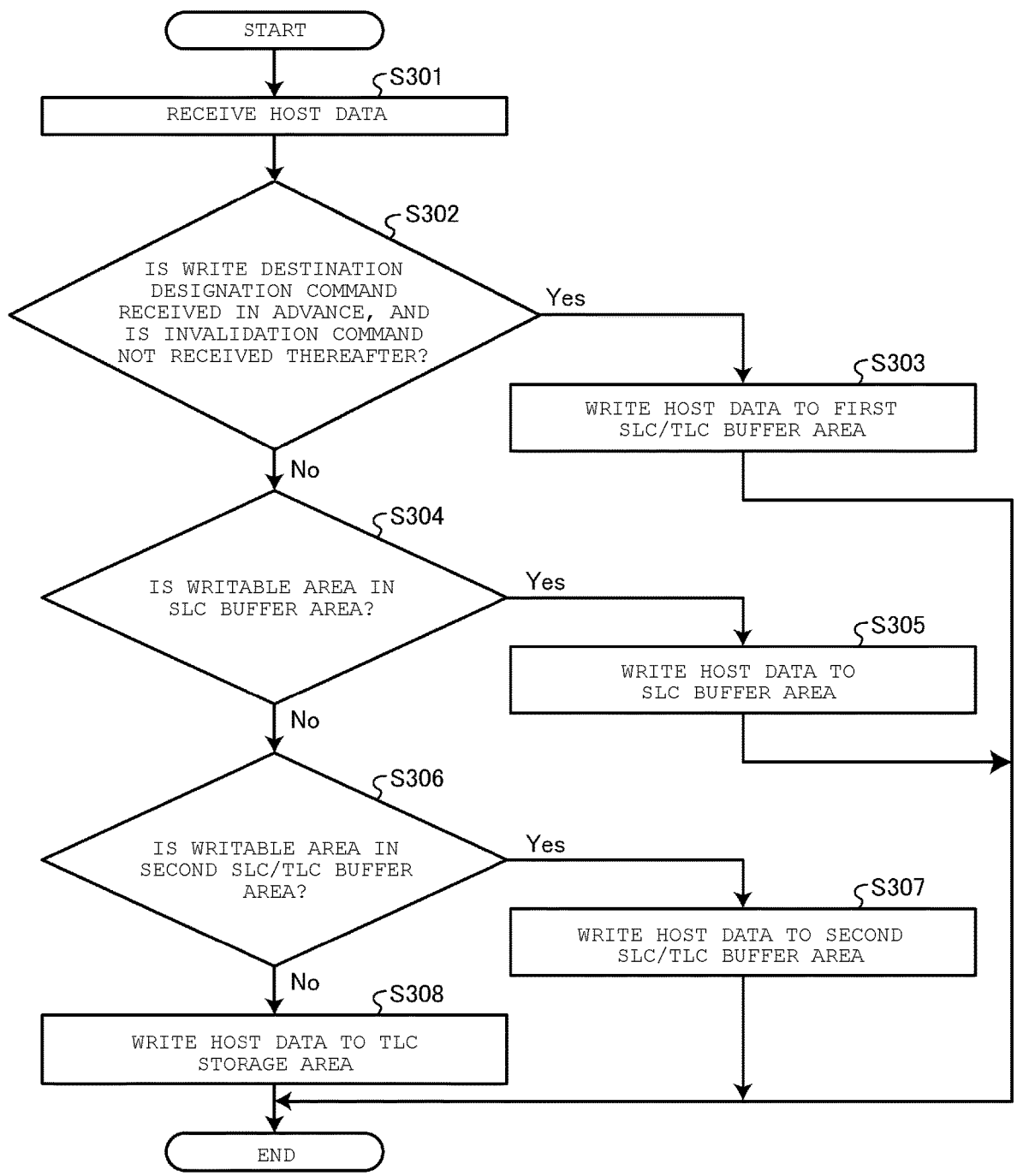
FIG. 12 is a flow chart illustrating an example of an operation of writing host data to the NAND memory according to the Modification Example 1 of the first embodiment.

FIG. 12 is a flow chart illustrating an example of an operation of writing host data to the NAND memory 200 according to Modification Example 1 of the first embodiment.

In steps S301 to S305, the same processes as steps S201 to S205 described with reference to FIG. 10 are executed.

When there is no writable area in the SLC buffer area 220 (S304: No), in step S306, the processor 101 determines whether there is a writable area in the second SLC/TLC buffer area 223, for example, by the same procedure as step S304 (or S204).

When there is a writable area in the second SLC/TLC buffer area 223 (S306: Yes), the processor 101 controls the controller 100 to write host data to the second SLC/TLC buffer area 223 (S307).

When there is no writable area in the second SLC/TLC buffer area 223 (S306: No), the processor 101 controls the controller 100 to write host data to the TLC user data area 222 (S308).

After step S303, S305, S307, or S308, the operation of writing host data to the NAND memory 200 ends.

Modification Example 2 of First Embodiment

According to the first embodiment and Modification Example 1 thereof, the capacity of the first SLC/TLC buffer area 221 is dynamically changed according to the number of free blocks belonging to the first SLC/TLC buffer area 221 and the number of free blocks belonging to the TLC user data area 222. The capacity of the first SLC/TLC buffer area 221 may not be necessarily changed dynamically.

For example, the memory system 1 may be configured such that the capacity of the first SLC/TLC buffer area 221 can be set from the host device 2.

Figure 13:
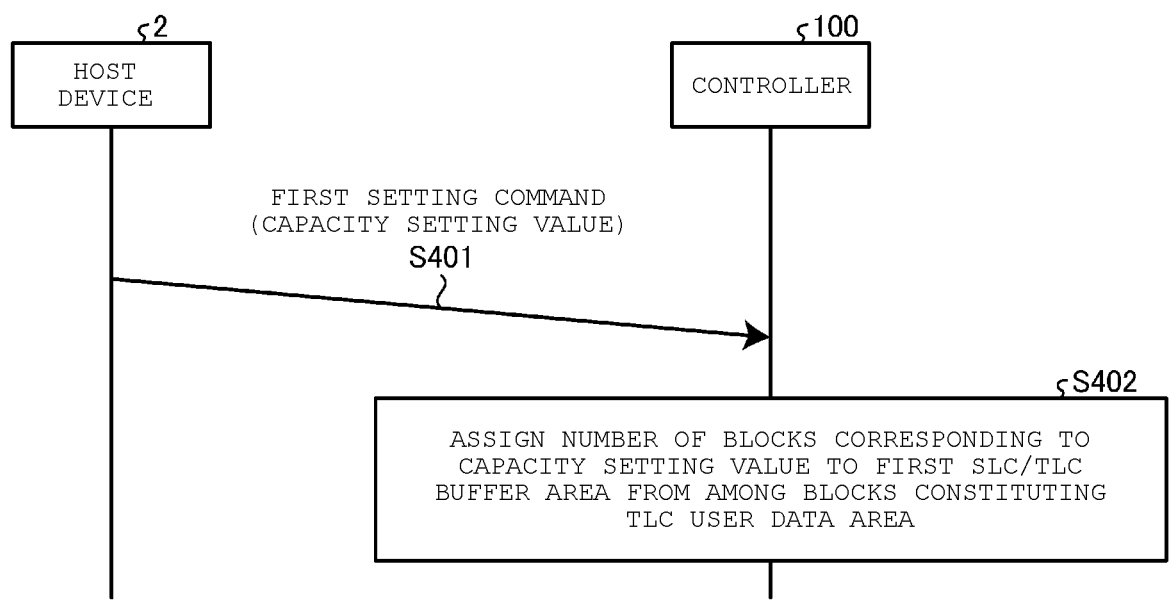
FIG. 13 is a diagram illustrating an example of an operation of setting a capacity of a first SLC/TLC buffer area according to Modification Example 2 of the first embodiment.

FIG. 13 is a diagram illustrating an example of an operation of setting capacity of the first SLC/TLC buffer area 221 according to Modification Example 2 of the first embodiment.

First, the host device 2 transmits a first setting command for setting the capacity of the first SLC/TLC buffer area 221, for example when initializing the memory system 1 (S401). The first setting command may be issued using a vendor-specific command value, or may be defined by a standard. The first setting command includes a capacity setting value of the first SLC/TLC buffer area 221. That is, the first setting command is a command for designating the capacity of the first SLC/TLC buffer area 221.

When the controller 100 receives the first setting command, the processor 101 assigns the number of blocks BLK corresponding to the capacity setting value to the first SLC/TLC buffer area 221 from among the group of blocks BLK constituting the TLC user data area 222. (S402). The processor 101 may assign all of the blocks BLK corresponding to the capacity setting value to the first SLC/TLC buffer area 221 as SLC blocks, may assign all of the blocks BLK to the first SLC/TLC buffer area 221 as TLC blocks, or may assign some of the blocks BLK to the first SLC/TLC buffer area 221 as SLC blocks and others as TLC blocks.

In this manner, the controller 100 may receive the first setting command for designating the capacity and assign the number of blocks BLK corresponding to the designated capacity to the first SLC/TLC buffer area 221.

The host device 2 can set the first SLC/TLC buffer area 221 according to the amount or frequency of hot data to be written to the memory system 1. Therefore, the memory system 1 is highly convenient for the host device 2.

Second Embodiment

In recent years, as memory cells became finer, the user capacity of commercially available memory systems increased. Depending on the intended use, the user capacity of the memory system may be excessive.

In addition, as memory cells became finer, the reliability of data stored in memory cells tends to decrease.

In addition, as described above, as the number of bits of data written in one memory cell increases, the range of each division 4 becomes narrower, an error is likely to occur, and thus the reliability of the data stored in the memory cell is low, and the upper limit of the number of P/E cycles is set low. Therefore, as the number of bits of data written in each memory cell increases, the usable period (that is, lifetime) of the memory system becomes shorter.

In addition, as the number of bits of data written in one memory cell increases, the write performance deteriorates.

In a second embodiment, a memory system in which the storage mode can be set by a command from a host device will be described. The user of the memory system of the second embodiment can set the storage mode of the memory system via the host device after considering the capacity, lifetime, write performance, and the like required for the memory system.

The memory system of the second embodiment is referred to as a memory system 1*a*, and the memory system 1*a* will be described. Further, items different from the first embodiment will be described, and descriptions of the same items as in the first embodiment will be omitted or will be briefly described.

Figure 14:
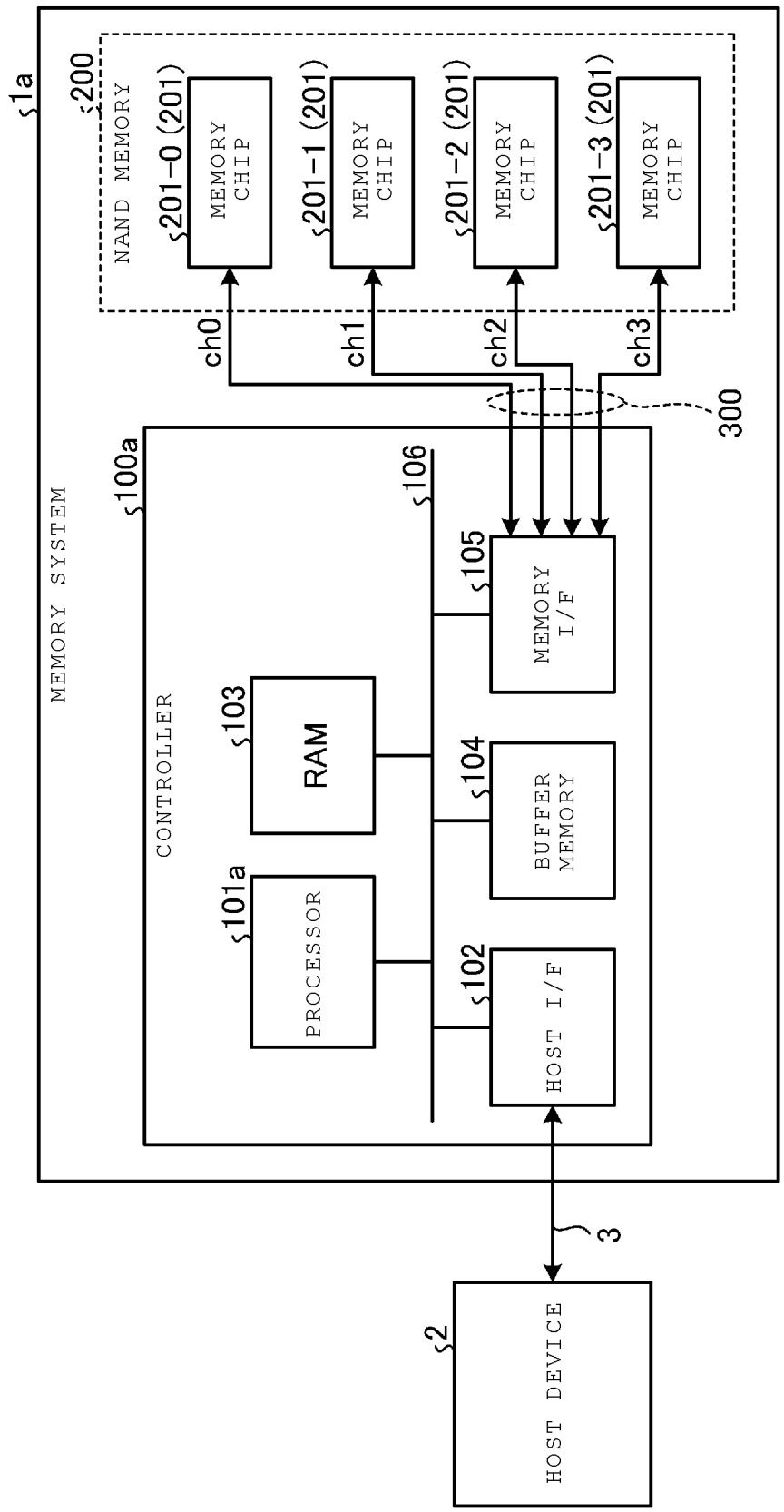
FIG. 14 is a schematic diagram illustrating an example of a configuration of a memory system according to a second embodiment.

FIG. 14 is a schematic diagram illustrating an example of a configuration of the memory system 1*a* according to the second embodiment.

The memory system 1*a* is connected to the host device 2 via the communication interface 3. The memory system 1*a* includes a controller 100*a* and the NAND memory 200. The controller 100*a* is connected to the NAND memory 200 by the memory bus 300.

The controller 100*a* includes a processor 101*a*, the host I/F 102, the RAM 103, the buffer memory 104, the memory I/F 105, and the internal bus 106. The processor 101*a*, the host I/F 102, the RAM 103, the buffer memory 104, and the memory I/F 105 are electrically connected to the internal bus 106. The processor 101*a* is a circuit capable of executing a computer program. The processor 101*a* is, for example, a CPU. The processor 101*a* comprehensively controls each component of the controller 100*a* based on a firmware program stored in advance in a predetermined location (for example, the NAND memory 200), thereby realizing various operations of the controller 100*a*.

Note that a part or all of the processes executed by the processor 101*a* may be executed by a dedicated hardware circuit.

The processor 101*a* can interpret and execute a second setting command for setting the storage mode from the host device 2.

The second setting command may be issued using a vendor-specific command value, or may be defined by a standard. The second setting command includes designating one of a plurality of storage modes. The processor 101*a* sets the storage mode of one or more blocks BLK constituting the NAND memory 200 to the storage mode designated by the second setting command, in response to the second setting command.

Figure 15:
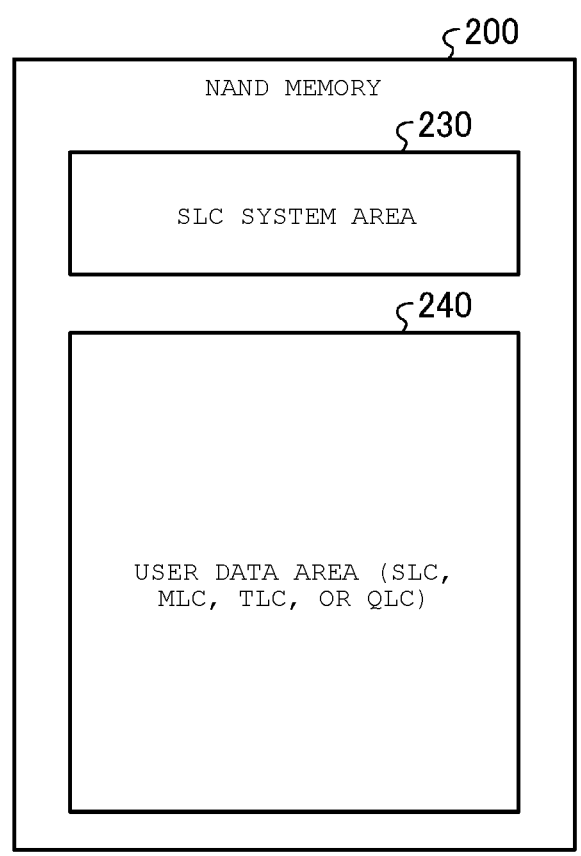
FIG. 15 is a schematic diagram illustrating an example of a configuration of a NAND memory according to the second embodiment.

FIG. 15 is a schematic diagram illustrating an example of a configuration of the NAND memory 200 according to the second embodiment.

As illustrated in FIG. 15, the NAND memory 200 includes an SLC system area 230 composed only of blocks BLK set to be used in the SLC mode, and a user data area 240 in which the storage mode can be set in any manner.

The SLC system area 230 stores the firmware program and management information of the memory system 1a. The management information includes, for example, a logical-to-physical address conversion table that records the mappings between LBAs and locations in the NAND memory 200. That is, the SLC system area 230 is a dedicated area for storing data necessary for the operation of the memory system 1a, that is, system data, and does not store user data. When system data is lost from the memory system 1a, it may be impossible for the memory system 1a to operate properly. Therefore, the SLC system area 230 includes blocks BLK used in the SLC mode, which is the storage mode with the highest reliability.

The user data area 240 is an area in which the user data received from the host device 2 is stored. It should be noted that the user data area 240 may store metadata such as LBA information and an error correction code in addition to user data.

The storage mode of the group of blocks BLK constituting the user data area 240 may be set by the second setting command from the host device 2. In one example, the storage mode of the group of blocks BLK constituting the user data area 240 may be set to any storage mode from the SLC mode, the MLC mode, the TLC mode, and the QLC mode. It should be noted that the list of storage modes that can be set by the second setting command from the host device 2 is not limited to this example.

Figure 16:
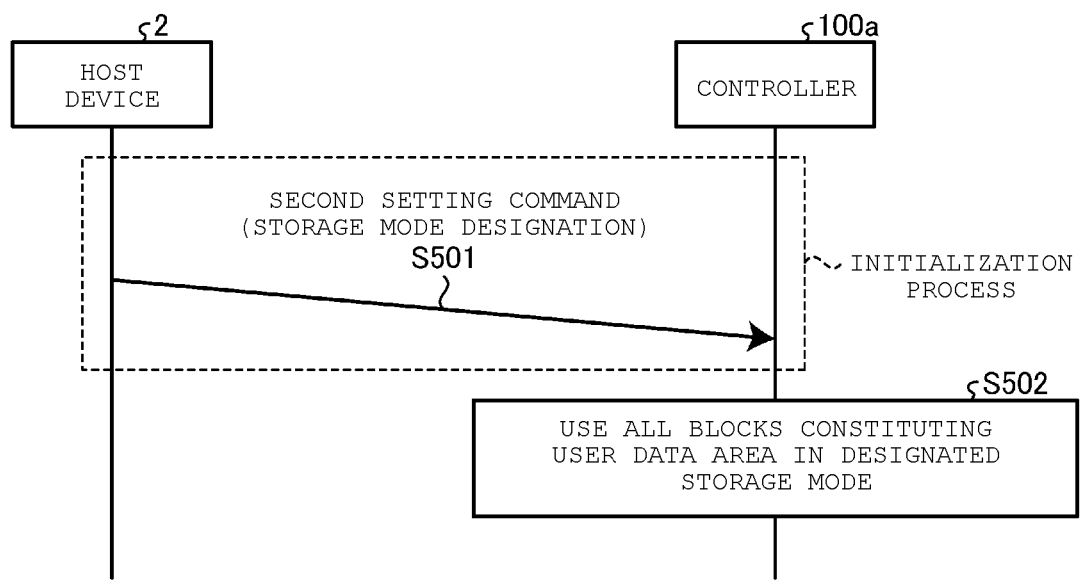
FIG. 16 is a diagram illustrating an example of an operation of setting a storage mode of the NAND memory according to the second embodiment.

FIG. 16 is a diagram illustrating an example of an operation of setting the storage mode of the NAND memory 200 according to the second embodiment.

First, the host device 2 transmits the second setting command for setting the storage mode of the NAND memory 200, for example when initializing the memory system 1a (S501). The second setting command includes designation of one of a plurality of storage modes. When the controller 100a receives the second setting command and subsequently accesses the user data area 240, the processor 101a uses all the blocks BLK constituting the user data area 240 in the storage mode designated by the second setting command (S502).

In this manner, according to the second embodiment, the controller 100a uses the user data area 240 in the storage mode designated by the second setting command.

Accordingly, the user of the memory system 1a can set the storage mode of the memory system 1a via the host device 2 after considering the capacity, lifetime, write performance, and the like required for the memory system 1a. Therefore, the convenience of the memory system 1a is high.

Modification Example 1 of Second Embodiment

As Modification Example 1 of the second embodiment, an operation of setting the storage mode of the NAND memory 200 at any timing will be described.

Figure 17:
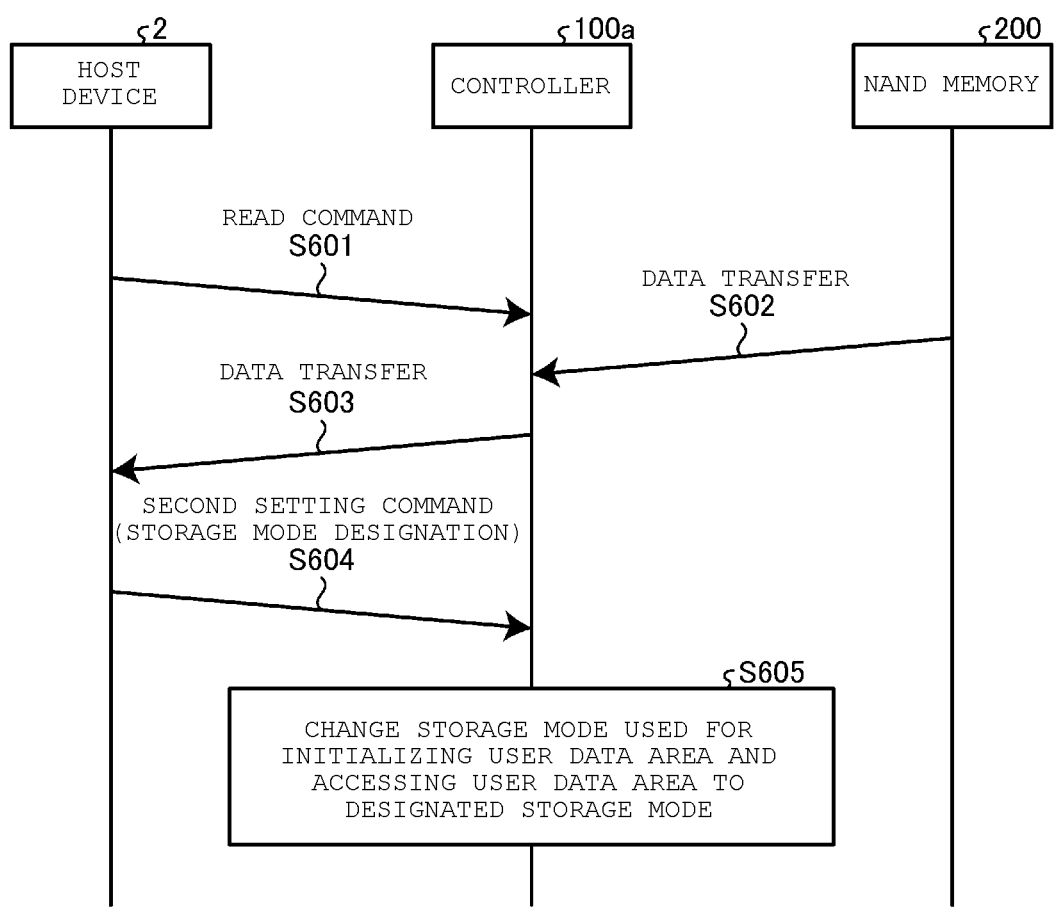
FIG. 17 is a diagram illustrating an example of an operation of setting a storage mode of a NAND memory according to Modification Example 1 of the second embodiment.

FIG. 17 is a diagram illustrating an example of an operation of setting the storage mode of the NAND memory 200 according to Modification Example 1 of the second embodiment.

In Modification Example 1 of the second embodiment, the user data area 240 is initialized by changing the storage mode. Therefore, the host device 2 first transmits a read command to the memory system 1a in order to read all necessary data out of the data already written to the user data area 240 (S601).

The controller 100a acquires the designated data from the NAND memory 200 according to the read command (S602), and transfers the acquired data to the host device 2 (S603).

It should be noted that the process of steps S601 to S603 may be repeated a plurality of times.

After reading all necessary data from the user data area 240, the host device 2 transmits the second setting command for setting the storage mode of the NAND memory 200 (S604). The second setting command includes designation of one of a plurality of storage modes. When the controller 100a receives the second setting command, the processor 101a changes the storage mode used for initializing the user data area 240 and accessing the user data area 240 to the storage mode designated by the second setting command (S605).

In this manner, when the user data area 240 is initialized by changing the storage mode, the host device 2 reads all the necessary data in the user data area 240 and then instructs to change the storage mode by the second setting command. After changing the storage mode, the host device 2 may write back the data previously read from the user data area 240 to the memory system 1a. In that case, the data is written to the user data area 240 in the storage mode designated by the second setting command.

Modification Example 2 of Second Embodiment

Free blocks are consumed by a host write process. Therefore, the controller 100a repeatedly executes the transcription process described with reference to FIG. 7 on the group of blocks BLK constituting the user data area 240 in order to prevent the free blocks from being depleted by the host write process. The controller 100a thereby generates a free block. In the transcription process, the controller 100a transcribes data in the user data area 240 between the blocks BLK constituting the user data area 240, thereby generating free blocks.

According to Modification Example 2 of the second embodiment, in the transcription process, the controller 100a transcribes valid data from a block BLK which has been used in the storage mode before the change to a block BLK in the storage mode after the change. That is, the data written in the storage mode before the change is rewritten in another block BLK in the storage mode after the change, by the transcription process. Therefore, it is possible to eliminate the need for the host device 2 to read necessary data from the user data area 240 before changing the storage mode.

Figure 18:
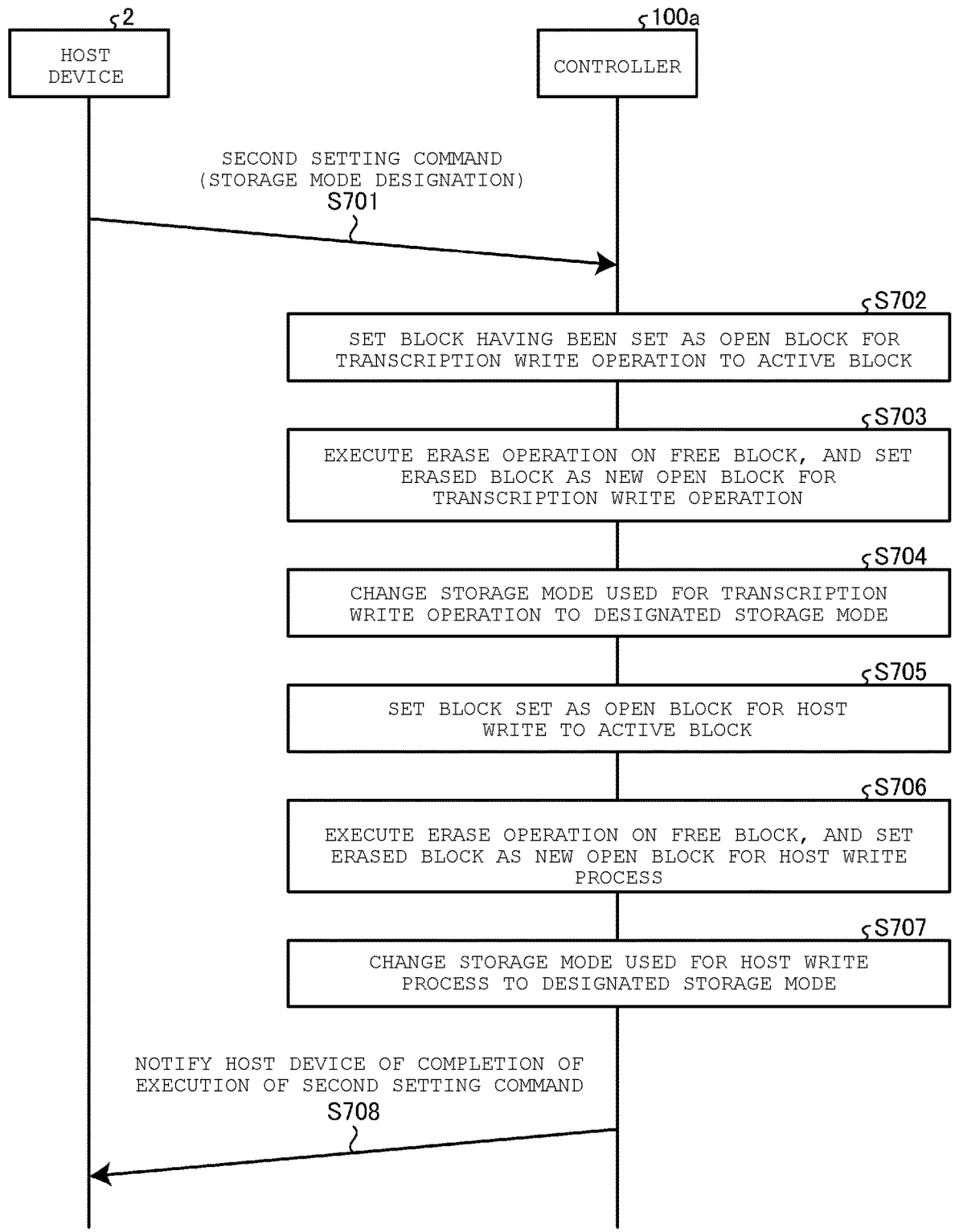
FIG. 18 is a diagram illustrating an example of an operation of setting a storage mode of a NAND memory according to Modification Example 2 of the second embodiment.

FIG. 18 is a diagram illustrating an example of an operation of setting the storage mode of the NAND memory 200 according to Modification Example 2 of the second embodiment.

The host device 2 transmits the second setting command for setting the storage mode of the NAND memory 200 (S701). The second setting command includes designation of a storage mode.

When the controller 100a receives the second setting command, the processor 101a sets a block BLK, which has been set as an open block for a transcription write operation, to an active block (S702). The processor 101a may set the open block to the active block by writing dummy data (padding data), for example. Then, the processor 101a executes an erase operation on a free block, and sets the erased block as a new open block for the transcription write operation (S703). Then, the processor 101a changes the storage mode, which is used for the transcription write operation, to the user data area 240, to the designated storage mode (S704).

After the process of steps S702 to S704, data written in the storage mode before the change is rewritten to the open block for the transcription write operation in the storage mode after the change. Therefore, by continuously executing the transcription process, the data written in the storage mode before the change is replaced with data written in the storage mode after the change, in the user data area 240.

After step S704, the processor 101a sets a block which has been set as an open block for a host write process to an active block (S705). The processor 101a may set the open block to the active block by writing dummy data (padding data), for example. Then, the processor 101a executes an erase operation on a free block, and sets the erased block as a new open block for the host write process (S706). Then, the processor 101a changes the storage mode, which is used for the host write process, to the user data area 240, to the designated storage mode (S707). Note that the process of steps S705 to S707 may be initiated before completion of the process of steps S702 to S704.

By the process of steps S705 to S707, the preparation is completed for writing the host data to the user data area 240 in the storage mode after the change. Therefore, the processor 101a notifies the host device 2 of the completion of execution of the second setting command (S708).

In this manner, according to Modification Example 2 of the second embodiment, the controller 100a changes the storage mode for writing transcription data to a block BLK which is the transcription destination, that is, an open block, based on the second setting command.

The data written in the storage mode before the change is rewritten in another block BLK in the storage mode after the change, by transcription process. Therefore, it is possible to eliminate the need for the host device 2 to read necessary data from the user data area 240 before changing the storage mode.

Further, according to Modification Example 2 of the second embodiment, the controller 100a executes an erase operation on one block BLK, which is a free block, in response to the second setting command. Then, the controller 100a sets the erased block BLK as a new open block, and executes a host write process to the open block in the storage mode designated by the second setting command.

Therefore, it is possible to process a write command from the host device 2 without waiting for the completion of the change of the storage mode for all the blocks BLK constituting the user data area 240.

It should be noted that the controller 100a may initiate the transcription process according to the second setting command, continue the transcription process until the change of the storage mode is completed for all the blocks BLK, complete the change of the storage mode for all the blocks BLK, and then receive a write command from the host device 2.

Third Embodiment

The memory system of a third embodiment is referred to as a memory system 1b, and the memory system 1b will be described. In addition, the controller of the third embodiment is referred to as a controller 100b. Further, items different from the second embodiment will be described, and descriptions of the same items as in the second embodiment will be omitted or will be briefly described.

Figure 19:
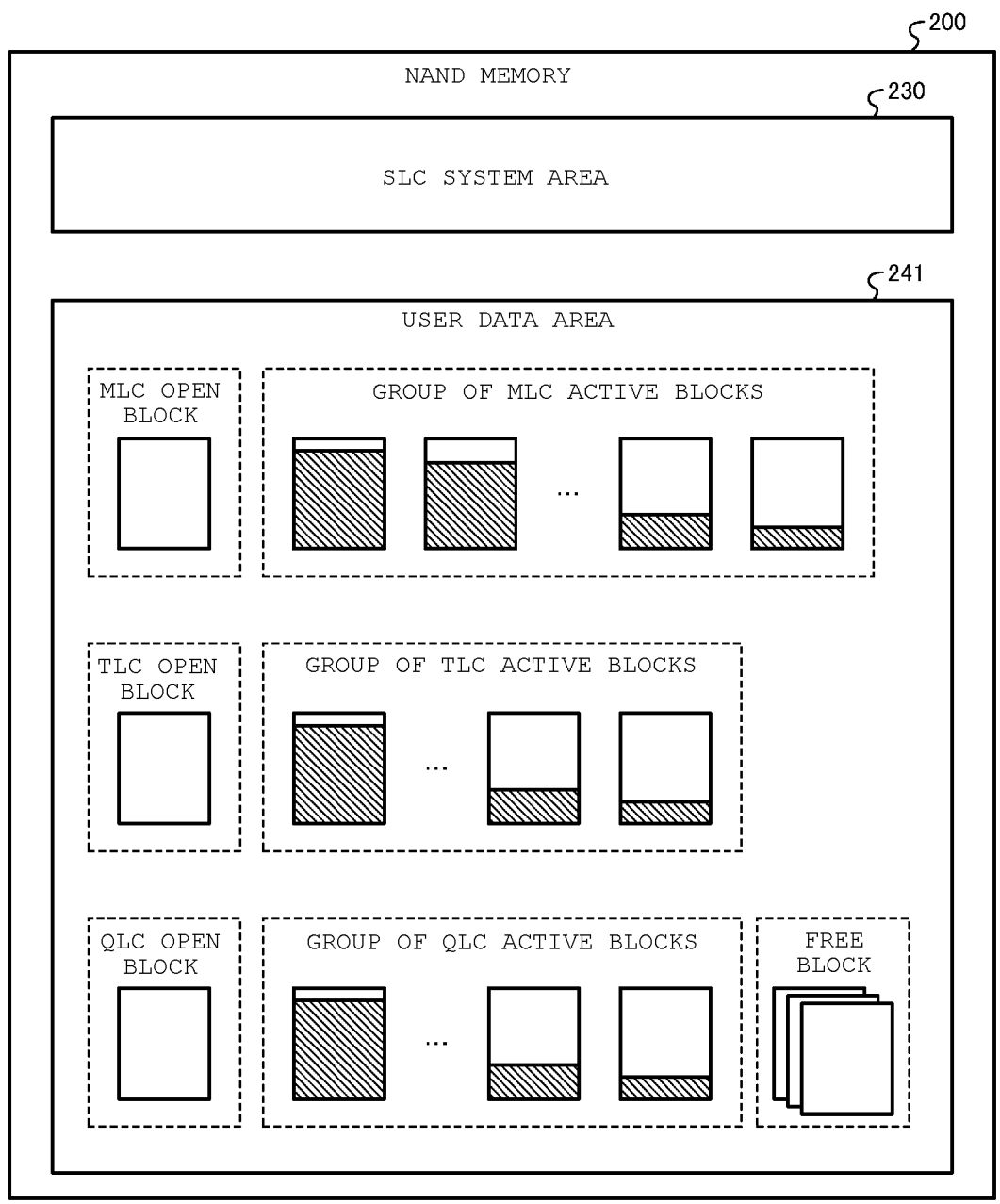
FIG. 19 is a schematic diagram illustrating an example of a configuration of a NAND memory according to a third embodiment.

FIG. 19 is a schematic diagram illustrating an example of a configuration of the NAND memory 200 according to the third embodiment.

As illustrated in FIG. 19, the NAND memory 200 includes the SLC system area 230 and a user data area 241.

A group of blocks BLK constituting the user data area 241 includes a plurality of open blocks used in different storage modes. Here, as an example, the plurality of open blocks of the user data area 241 includes: an open block used in the MLC mode (referred to as an MLC open block); an open block used in the TLC mode (referred to as a TLC open block); and an open block used in the QLC mode (referred to as a QLC open block).

The host data is written to an open block in the storage mode designated by the host device 2 among the MLC open block, the TLC open block, and the QLC open block.

The group of blocks BLK constituting the user data area 241 further includes: a group of active blocks (MLC active blocks) that are used in the MLC mode and that transitioned from the MLC open block; a group of active blocks (TLC active blocks) that are used in the TLC mode and that transitioned from the TLC open block; and a group of active blocks (QLC active blocks) that are used in the QLC mode and that transitioned from the QLC open block.

Furthermore, the group of blocks BLK constituting the user data area 241 includes one or more free blocks. Each free block can transition to the MLC open block, the TLC open block, or the QLC open block.

Figure 20:
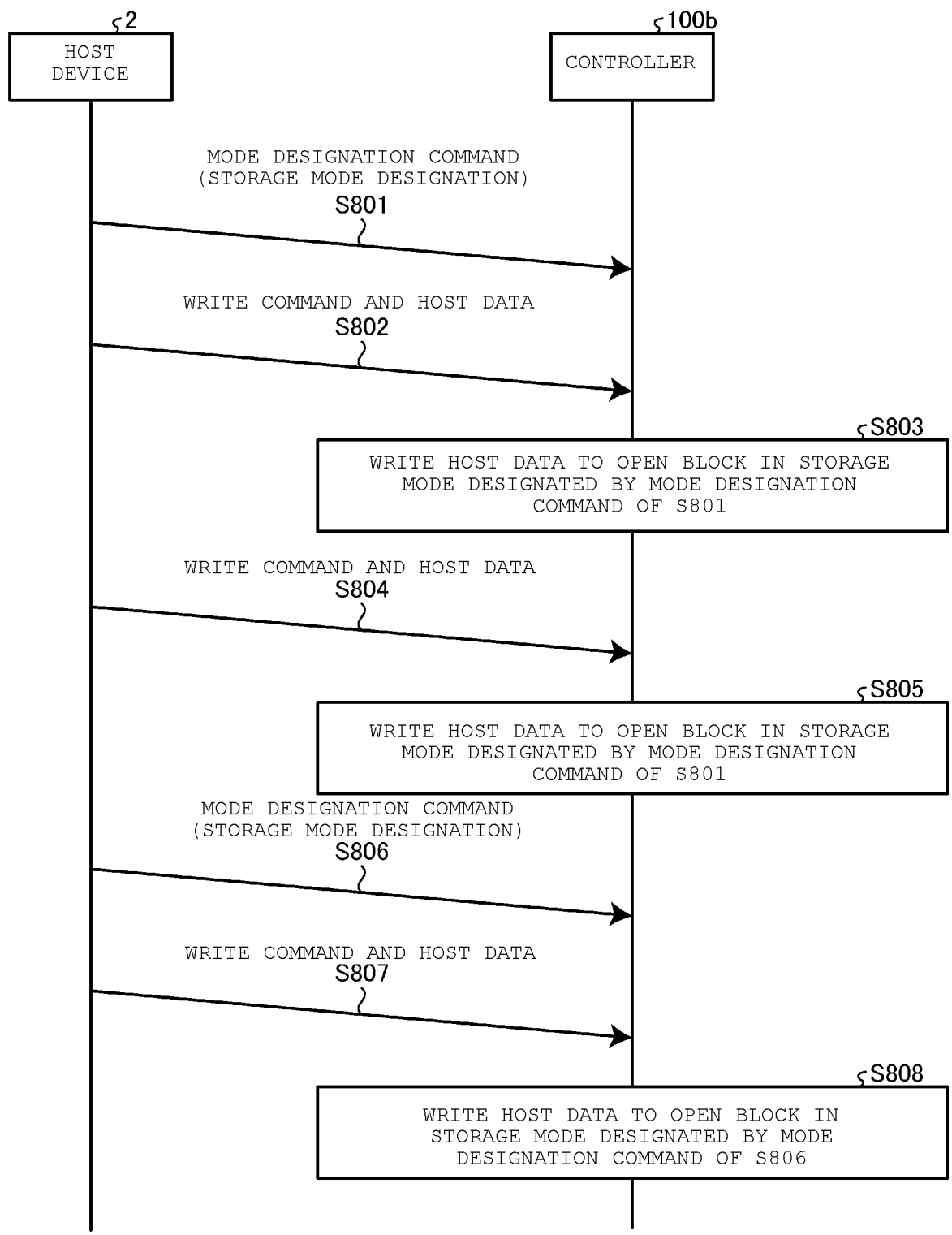
FIG. 20 is a diagram illustrating an example of a host write process according to the third embodiment.

FIG. 20 is a diagram illustrating an example of a host write process according to the third embodiment.

First, the host device 2 issues a mode designation command (S801). The mode designation command may be issued using a vendor-specific command value, or may be defined by a standard. The mode designation command includes designation of one of a plurality of storage modes.

Following step S801, the host device 2 transmits a write command and host data to the memory system 1b (S802). In the memory system 1b, the controller 100b writes the host data to an open block among an MLC open block, a TLC open block, and a QLC open block, in the storage mode designated by the mode designation command of step S801, which is the last received mode designation command (S803).

When the host device 2 further transmits a write command and host data to the memory system 1b (S804), in the memory system 1b, the controller 100b writes the host data to an open block among an MLC open block, a TLC open block, and a QLC open block, in the storage mode designated by the mode designation command of step S801, which is the last received mode designation command (S805).

When changing the storage mode for writing, the host device 2 issues the mode designation command for designating a new storage mode (S806). After that, when the host device 2 further transmits a write command and host data to the memory system 1b (S807), in the memory system 1b, the controller 100b writes the host data to an open block among an MLC open block, a TLC open block, and a QLC open block, in the storage mode designated by the mode designation command of step S806, which is the last received mode designation command (S808).

In this manner, according to the third embodiment, the controller 100*b* writes host data to an open block in the storage mode designated by the host device 2 among the plurality of storage modes.

Accordingly, the user of the memory system 1*b* can set the storage mode used for writing data via the host device 2 after considering the capacity, lifetime, write performance, and the like required for the memory system 1*b*. Therefore, the convenience of the memory system 1*b* is high.

It should be noted that the host device 2 may determine the storage mode used for writing data according to a predetermined algorithm.

For example, when writing data that is frequently read-accessed, the host device 2 designates the MLC mode by the mode designation command, and then writes the data. An example of frequently read-accessed data is system data of the host device 2, such as the operating system program of the host device 2.

Further, for example, when writing data for which a rewrite operation or a trim operation is frequently performed, the host device 2 designates the TLC mode by the mode designation command and then writes the data. An example of such data includes directory information of data files managed by the host device 2.

Further, for example, when writing relatively large-sized data, the host device 2 designates the QLC mode by the mode designation command, and then writes the data. An example of relatively large-sized data is the body of a data file managed by the host device 2.

In this manner, the host device 2 can change the storage mode during writing according to the properties of the write data. Therefore, the convenience of the memory system 1*b* is high.

It should be noted that the host device 2 is required to know the available capacity of the memory system 1*b*. According to the third embodiment, the controller 100*b* is configured to respond to a request from the host device 2 with the available capacity.

Figure 21:
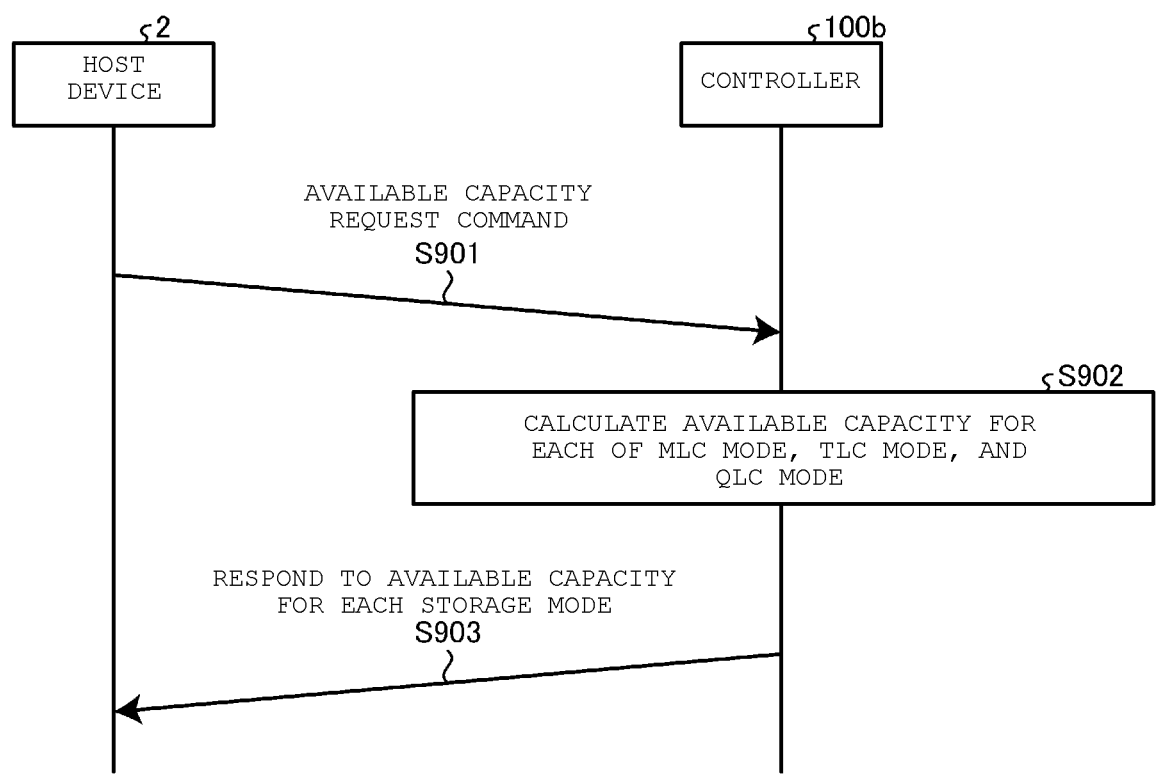
FIG. 21 is a diagram illustrating an example of an operation of checking an available capacity of the memory system according to the third embodiment.

FIG. 21 is a diagram illustrating an example of an operation of checking the available capacity according to the third embodiment.

When the host device 2 desires to check the available capacity of the memory system 1*b*, the host device 2 transmits an available capacity request command for the memory system 1*b* (S901). The available capacity request command may be issued using a vendor-specific command value, or may be defined by a standard.

The controller 100*b* calculates the available capacity of the user data area 241 for each of the MLC mode, the TLC mode, and the QLC mode according to the available capacity request command (S902). The controller 100*b* then responds to the host device 2 with the available capacity calculated for each storage mode (S903).

The host device 2 can select a storage mode for writing data thereafter based on the received available capacity for each storage mode. Therefore, the convenience of the memory system 1*b* is high.

Fourth Embodiment

In the third embodiment, the controller 100*b* writes host data to an open block in the storage mode designated by the host device 2 among the plurality of storage modes.

In a fourth embodiment, the controller writes host data to an open block in the storage mode that corresponds to the properties of the host data among the plurality of storage modes.

The memory system of the fourth embodiment is referred to as a memory system 1*c*, and the memory system 1*c* will be described. In addition, the controller of the fourth embodiment is referred to as a controller 100*c*. Further, items different from the third embodiment will be described, and descriptions of the same items as in the third embodiment will be omitted or will be briefly described.

Figure 22:
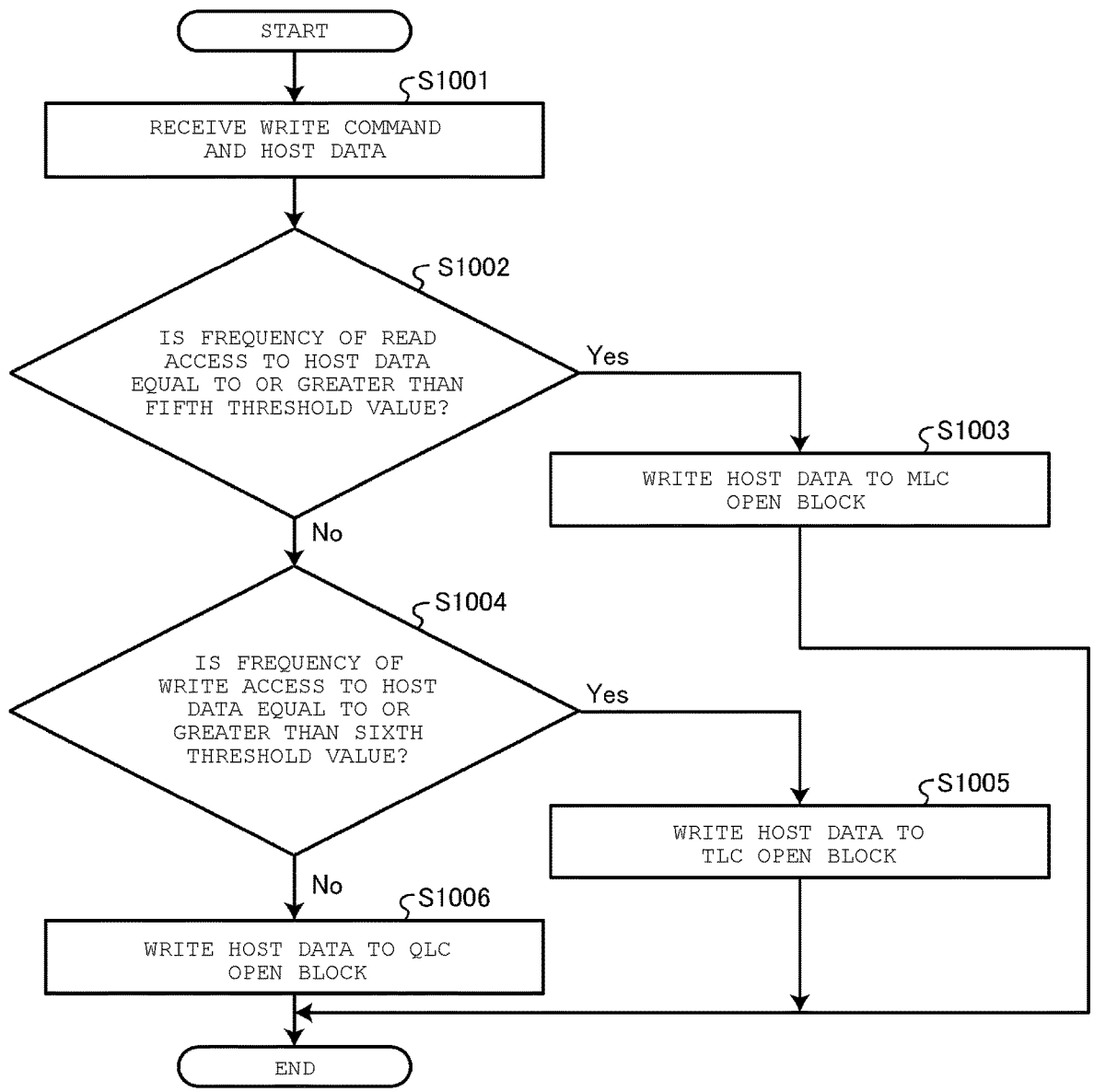
FIG. 22 is a diagram illustrating an example of a host write process according to a fourth embodiment.

FIG. 22 is a diagram illustrating an example of a host write process according to the fourth embodiment.

When the memory system 1*c* receives a write command and host data from the host device 2 (S1001), the controller 100*c* determines whether the frequency of read access to the host data is equal to or greater than a predetermined fifth threshold value (S1002).

For example, the controller 100*c* records the frequency of read access for each LBA. In step S1002, the controller 100*c* estimates the frequency of read access to the host data based on the LBA provided in the write command and the recorded value of the read access frequency for each LBA. It should be noted that the method of estimating the frequency of read access to host data is not limited to this example.

When the frequency of read access to the host data is equal to or greater than the fifth threshold value (S1002: Yes), the controller 100*c* writes the host data to an MLC open block (S1003).

When the frequency of read access to the host data is not equal to or greater than the fifth threshold value (S1002: No), the controller 100*c* determines whether the frequency of write access to the host data is equal to or greater than a predetermined sixth threshold value (S1004).

For example, the controller 100*c* records the write access frequency for each LBA. In step S1004, the controller 100*c* estimates the frequency of write access to the host data based on the LBA provided in the write command and the recorded value of the write access frequency for each LBA. It should be noted that the method of estimating the frequency of write access to host data is not limited to this example.

When the frequency of write access to the host data is equal to or greater than the sixth threshold value (S1004: Yes), the controller 100*c* writes the host data to a TLC open block (S1005).

When the frequency of write access to the host data is not equal to or greater than the sixth threshold value (S1004: No), the controller 100*c* writes the host data to a QLC open block (S1006).

After steps S1003, S1005, or S1006, the host write process ends.

In this manner, according to the fourth embodiment, the controller 100*c* determines the write destination open block according to the frequency of read access and the frequency of write access to host data.

It should be noted that the criteria for determining the write destination open block are not limited to the frequency of read access and the frequency of write access. The controller 100*c* may determine the write destination open block based on any property of the host data. The properties of the host data are, for example, read access frequency, write access frequency, or size.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system connectable to a host device, comprising:
   a non-volatile memory including a plurality of blocks each having a plurality of memory cells and capable of having data written in a first mode and in a second mode, the first mode being a mode in which data of a first number of bits is written in each memory cell, the second mode being a mode in which data of a second number of bits is written in each memory cell, the second number being larger than the first number; and
   a controller electrically connected to the non-volatile memory and configured to:
      assign a first plurality of blocks among the plurality of blocks to a first area;
      assign a second plurality of blocks, different from the first plurality of blocks, among the plurality of blocks to a second area;
      assign a third plurality of blocks, different from the first plurality of blocks and the second plurality of blocks, among the plurality of blocks to a third area;
      set the first mode to be used for each block assigned to the first area;
      set the second mode to be used for each block assigned to the second area;
      set one of the first mode or the second mode to be used for each block assigned to the third area;
      allow the host device to designate a write destination area out of the first area and the third area;
      write data received from the host device to an area that corresponds to the write designation area;
      generate free blocks among the first plurality of blocks by transcribing valid data written to the first area to the second area; and
      generate free blocks among the third plurality of blocks by transcribing valid data written to the third area to the second area.

2. The memory system according to claim 1, wherein the controller is configured further to:
   generate free blocks among the second plurality of blocks by transcribing valid data stored in the second area between the second plurality of blocks; and
   determine whether a block is to be assigned to the second area or the third area, according to (i) the number of free blocks among the second plurality of blocks and (ii) the number of free blocks among the third plurality of blocks.

3. The memory system according to claim 2, wherein the controller is configured to assign at least one of the third plurality of blocks to the second area in response to the number of free blocks among the second plurality of blocks being smaller than a first threshold value.

4. The memory system according to claim 2, wherein the controller is configured to assign at least one of the third plurality of blocks to the second area in response to (i) the number of free blocks among the second plurality of blocks being smaller than a first threshold value and (ii) a capacity of the third area being greater than a second threshold value.

5. The memory system according to claim 3, wherein the controller is configured to assign at least one of the second plurality of blocks to the third area in response to (i) the number of free blocks among the second plurality of blocks being larger than the first threshold value and (ii) the number of free blocks among the third plurality of blocks being smaller than a third threshold value.

6. The memory system according to claim 3, wherein the controller is configured to:
   assign at least one of the second plurality of blocks to the third area as a block used in the first mode in response to (i) the number of free blocks among the second plurality of blocks being larger than the first threshold value, (ii) the number of free blocks among the third plurality of blocks being smaller than a third threshold value, and (iii) a capacity of the second area being greater than a fourth threshold value; and
   assign at least one of the second plurality of blocks to the third area as a block used in the second mode in response to (i) the number of free blocks among the second plurality of blocks being larger than the first threshold value, (ii) the number of free blocks among the third plurality of blocks being smaller than the third threshold value, and (iii) the capacity of the second area being less than the fourth threshold value.

7. The memory system according to claim 1, wherein the controller is further configured to:
   in response to receiving a command for designating a capacity from the host device, assign blocks to the third area, the number of blocks assigned to the third area corresponding to the designated capacity.

8. The memory system according to claim 1, wherein the memory system includes one of a flash storage or a solid state drive.

9. The memory system according to claim 1, wherein the non-volatile memory includes a NAND flash memory.

10. The memory system according to claim 1, wherein the memory cells of the non-volatile memory are arranged as three-dimensional memory cells.

11. The memory system according to claim 1, wherein the controller includes at least one processor.

12. A memory system connectable to a host device, comprising:
   a non-volatile memory including a storage area having a plurality of memory cells; and
   a controller electrically connected to the non-volatile memory and configured to:
      use the storage area in a mode designated by a command from the host device, the command being a command designating one of a plurality of modes in which the number of bits of data written in each memory cell is different;
      calculate an available capacity of the storage area used in the mode designated by the command; and
      notify the host device of the calculated available capacity.

* * * * *